(12) United States Patent
Moradnia et al.

(10) Patent No.: US 11,981,195 B2
(45) Date of Patent: May 14, 2024

(54) DUCT SURFACE HEAT EXCHANGER FOR VEHICLES

(71) Applicant: Honda Motor Co., Ltd., Tokyo (JP)

(72) Inventors: Pirooz Moradnia, Dublin, OH (US); Matthew L. Metka, Plain City, OH (US); Pratap Thamanna Rao, Columbus, OH (US); Daniel A. Favela Tentori, Columbus, OH (US); Brian R. Reynolds, Dublin, OH (US); David W. Halt, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 338 days.

(21) Appl. No.: 17/208,537

(22) Filed: Mar. 22, 2021

(65) Prior Publication Data

US 2022/0297530 A1 Sep. 22, 2022

(51) Int. Cl.
*B60K 11/02* (2006.01)
*F28D 1/02* (2006.01)
*F28F 1/12* (2006.01)

(52) U.S. Cl.
CPC ............ *B60K 11/02* (2013.01); *F28D 1/0233* (2013.01); *F28F 1/12* (2013.01); *F28F 2250/08* (2013.01)

(58) Field of Classification Search
CPC .......... B60H 2001/00614; B60K 11/02; B60K 11/08; F28F 2250/08; F28F 1/12
See application file for complete search history.

(56) References Cited

U.S. PATENT DOCUMENTS

| | | | | | |
|---|---|---|---|---|---|
| 2,242,494 | A | * | 5/1941 | Wolf | B60K 11/00 180/68.1 |
| 3,970,164 | A | * | 7/1976 | Suzuki | B60K 11/04 180/69.21 |
| 4,690,204 | A | * | 9/1987 | Reichel | B60K 11/08 165/44 |
| 4,966,408 | A | * | 10/1990 | Yura | B60K 11/08 180/89.2 |

(Continued)

FOREIGN PATENT DOCUMENTS

| CN | 106379428 B | 2/2017 |
|---|---|---|
| DE | 19754174 A1 | 6/1998 |

(Continued)

OTHER PUBLICATIONS

Translation of Patent Document DE19755095A1 entitled Translation—DE19755095A1 (Year: 2023).*

(Continued)

*Primary Examiner* — Paul Alvare
(74) *Attorney, Agent, or Firm* — Plumsea Law Group, LLC

(57) ABSTRACT

Embodiments of a surface heat exchanger for a vehicle are described. In one embodiment, a surface heat exchanger includes a plurality of fins on a first outer surface The surface heat exchanger is mounted within an interior of a duct of a vehicle. An inlet of the duct is located on a side of the vehicle forward of a rear axle of the vehicle and an outlet of the duct is located rearward of the inlet. The plurality of fins of the surface heat exchanger are exposed to the interior of the duct. The plurality of fins are configured to transfer heat to airflows interacting with the plurality of fins as the airflows pass through the duct.

14 Claims, 15 Drawing Sheets

(56) References Cited

U.S. PATENT DOCUMENTS

| | | | |
|---|---|---|---|
| 5,042,870 A * | 8/1991 | Yura | B60K 11/08 |
| | | | 296/180.1 |
| 5,669,813 A * | 9/1997 | Jairazbhoy | B60H 1/00271 |
| | | | 361/645 |
| 6,354,003 B1 * | 3/2002 | Lehmann | B60K 11/08 |
| | | | 29/527.2 |
| 6,443,253 B1 * | 9/2002 | Whitehead | B60K 1/04 |
| | | | 165/41 |
| 7,163,073 B2 | 1/2007 | Schmid et al. | |
| 7,997,367 B2 * | 8/2011 | Nakamura | H01M 50/249 |
| | | | 180/68.5 |
| 8,172,307 B2 | 5/2012 | Froeschle et al. | |
| 8,887,844 B2 | 11/2014 | Chew et al. | |
| 8,955,628 B2 | 2/2015 | Murray | |
| 9,662,967 B2 | 5/2017 | Rutschmann et al. | |
| 9,863,403 B2 | 1/2018 | Gaither | |
| 10,344,663 B2 | 7/2019 | Nam | |
| 10,351,181 B2 | 7/2019 | McKillen et al. | |
| 2003/0183432 A1 * | 10/2003 | Suzuki | F01P 3/18 |
| | | | 180/68.1 |
| 2005/0109493 A1 * | 5/2005 | Wu | F02B 29/0462 |
| | | | 165/157 |
| 2008/0190678 A1 * | 8/2008 | Penz | B60K 11/08 |
| | | | 165/44 |
| 2008/0236924 A1 * | 10/2008 | Horii | B60K 1/04 |
| | | | 180/220 |
| 2010/0126438 A1 * | 5/2010 | Kim | F01P 9/06 |
| | | | 165/104.26 |
| 2010/0307723 A1 * | 12/2010 | Thomas | H01M 10/6568 |
| | | | 165/104.33 |
| 2012/0145272 A1 | 6/2012 | Chu et al. | |
| 2012/0292121 A1 * | 11/2012 | Murray | B60K 11/08 |
| | | | 180/68.1 |
| 2013/0292097 A1 * | 11/2013 | Miyamoto | B60L 3/003 |
| | | | 454/143 |
| 2014/0193683 A1 * | 7/2014 | Mardall | B60K 1/04 |
| | | | 429/99 |
| 2014/0238636 A1 | 8/2014 | Parry-Williams et al. | |
| 2015/0298952 A1 * | 10/2015 | Nakazawa | B60K 1/00 |
| | | | 187/224 |
| 2018/0286781 A1 * | 10/2018 | Yoshihara | F28F 3/022 |
| 2019/0390913 A1 | 12/2019 | Favaretto et al. | |
| 2020/0156460 A1 * | 5/2020 | Oh | B60K 1/00 |
| 2021/0016654 A1 * | 1/2021 | Moss | F01P 1/06 |
| 2021/0402843 A1 * | 12/2021 | Moradnia | B60K 11/04 |
| 2022/0258596 A1 * | 8/2022 | Judge | B60K 11/04 |
| 2022/0297530 A1 * | 9/2022 | Moradnia | B60K 11/02 |

FOREIGN PATENT DOCUMENTS

| | | | | |
|---|---|---|---|---|
| DE | 19755095 A1 * | 6/1998 | | B60H 1/00328 |
| DE | 102014116612 A1 | 5/2016 | | |
| DE | 102016204917 A1 | 9/2017 | | |
| DE | 102016106546 A1 | 10/2017 | | |
| DE | 102017200627 A1 * | 7/2018 | | |
| EP | 1060934 B1 | 11/2006 | | |
| JP | 2013035323 A | 2/2013 | | |
| KR | 20120139007 A * | 12/2012 | | |
| WO | 201627014 A1 | 2/2016 | | |

OTHER PUBLICATIONS

Translation of Patent Document DE102017200627A1 entitled Translation—DE102017200627A1 (Year: 2023).*

Translation of Korean Patent Document KR20120139007A entitled Translation—KR20120139007A (Year: 2023).*

* cited by examiner

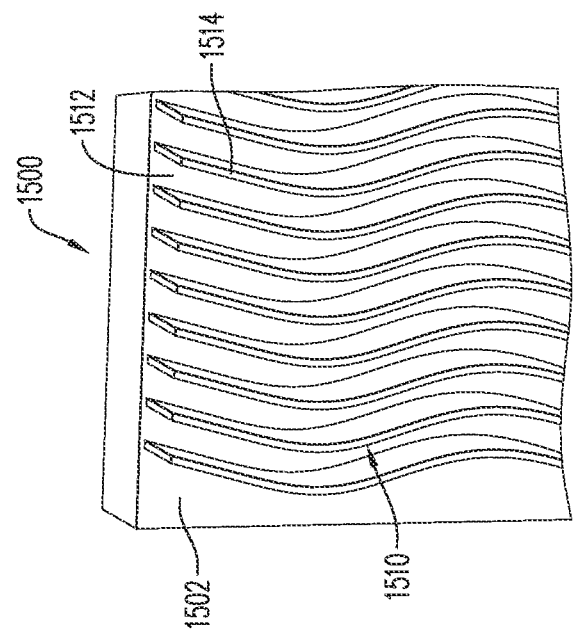
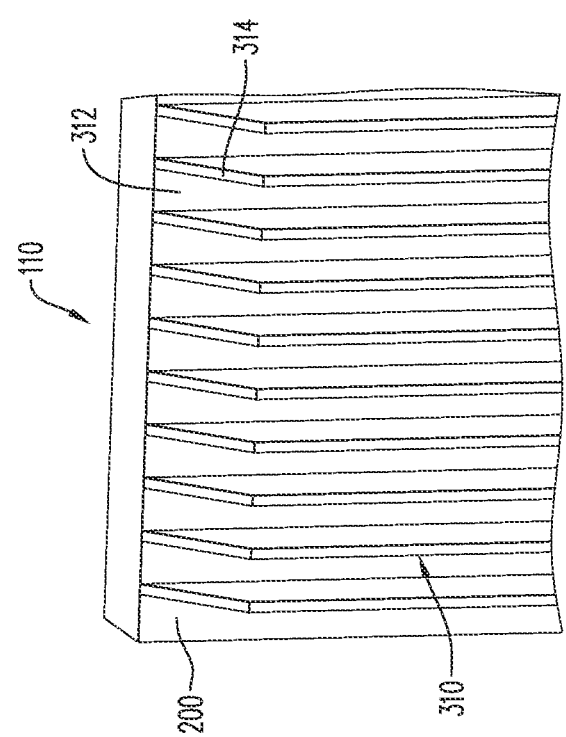

DUCT SURFACE HEAT EXCHANGER FOR VEHICLES

BACKGROUND

This disclosure relates generally to a heat transfer system for vehicle components, and more particularly, to a heat transfer system including a surface heat exchanger arranged in one or more ducts of a vehicle.

Many vehicle systems and components employ heat transfer systems to help provide cooling or otherwise assist with regulating temperatures. Conventionally, vehicles have traditionally positioned heat exchangers, such as radiators, at the front of the vehicle where they may receive maximum airflow to assist with heat transfer. However, as more vehicle systems and components require or benefit from heat transfer systems, the impact of such heat transfer systems on aerodynamic performance and packaging becomes an important consideration. As a result, conventional heat transfer systems may be limited in their ability to provide sufficient cooling or temperature regulation to vehicle systems and components.

Accordingly, there is a need in the art for an improved heat transfer system.

SUMMARY

In one aspect, a surface heat exchanger for a vehicle is provided. The surface heat exchanger includes a plurality of fins disposed on a first outer surface of the surface heat exchanger. The surface heat exchanger is mounted within an interior of a duct of a vehicle. An inlet of the duct is located on a side of the vehicle forward of a rear axle of the vehicle and an outlet of the duct is located rearward of the inlet. The plurality of fins of the surface heat exchanger are exposed to the interior of the duct. The plurality of fins are configured to transfer heat to airflows interacting with the plurality of fins as the airflows pass through the duct.

In another aspect, a heat transfer system for a vehicle is provided. The heat transfer system includes a first duct on one side of the vehicle providing a passageway for air flowing through the first duct when the vehicle is moving. The first duct has an inlet located forward of a rear axle of the vehicle and an outlet located rearward of the rear axle. A first surface heat exchanger is positioned within an interior of the first duct. The heat transfer system also includes at least one vehicle component, a heat transfer fluid reservoir, and a pump. The first surface heat exchanger forms a heat transfer fluid flow circuit with the at least one vehicle component, the heat transfer fluid reservoir, and the pump. The first surface heat exchanger forms an air flow pathway defined so that air flows through the inlet into the first duct, along an outer surface of the first surface heat exchanger within the interior of the first duct, and exits the first duct through the outlet.

In another aspect, a vehicle heat transfer system is provided. The vehicle heat transfer system includes a duct having an inlet located forward of a rear axle of a vehicle and an outlet located rearward of the rear axle, the duct providing a passageway for air flowing through the duct when the vehicle is moving. The vehicle heat transfer system also includes a surface heat exchanger including an outer surface having a plurality of fins. The outer surface including the plurality of fins is exposed to the air flowing through the duct. An air flow pathway through the duct is defined so that air flows through the inlet into the duct, along the plurality of fins on the outer surface of the surface heat exchanger, and exits the duct through the outlet.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

FIG. 15A is an enlarged view of an example embodiment of a plurality of fins on a heat exchanger in accordance with aspects of the present disclosure; and FIG. 15B is an enlarged view of an alternative embodiment of a plurality of fins on a heat exchanger in accordance with aspects of the present disclosure.

DETAILED DESCRIPTION

Embodiments of a heat transfer system for cooling vehicle components that includes a heat exchanger arranged within one or more ducts of a motor vehicle are described herein. The techniques of the present embodiments may be used to provide a more efficient solution for cooling and/or regulating temperatures of vehicle systems and components than conventional arrangements.

The example embodiments described herein may be used in connection with a motor vehicle. The term "motor vehicle" as used throughout the specification and claims refers to any moving vehicle that is powered by a motor that consumes any form of energy. The term motor vehicle includes, but is not limited to: cars, trucks, vans, minivans, SUVs, motorcycles, scooters, boats, watercraft, and aircraft. Motor vehicles can include vehicles powered by internal combustion engines, as well as electrified vehicles and vehicles powered using other forms of energy. Electrified vehicles may include an electric vehicle powered by a battery or fuel cell (i.e., a battery electric vehicle (BEV) or fuel cell vehicle (FCV)) as well as a hybrid electric vehicle powered by an electric motor, generator, or battery in addition to an internal combustion engine (i.e., a hybrid electric vehicle (HEV) or plug-in hybrid electric vehicle (PHEV)).

In various embodiments, a heat exchanger may be positioned within an interior of one or more air ducts or passageways with an inlet arranged on sides of the motor vehicle such that air flowing through the duct or passageway also travels over a portion of the heat exchanger that has a surface that is exposed to the interior of the duct or passageway. That is, an airflow pathway is defined such that air flows through an inlet on at least one side of the motor vehicle into the duct or passageway, along the surface of the heat exchanger inside the duct or passageway, and exits the duct or passageway through an outlet located at the rear of the motor vehicle. With this arrangement, a heat exchanger positioned within the duct or passageway may act to cool various systems and/or components of the vehicle.

Figure 1:
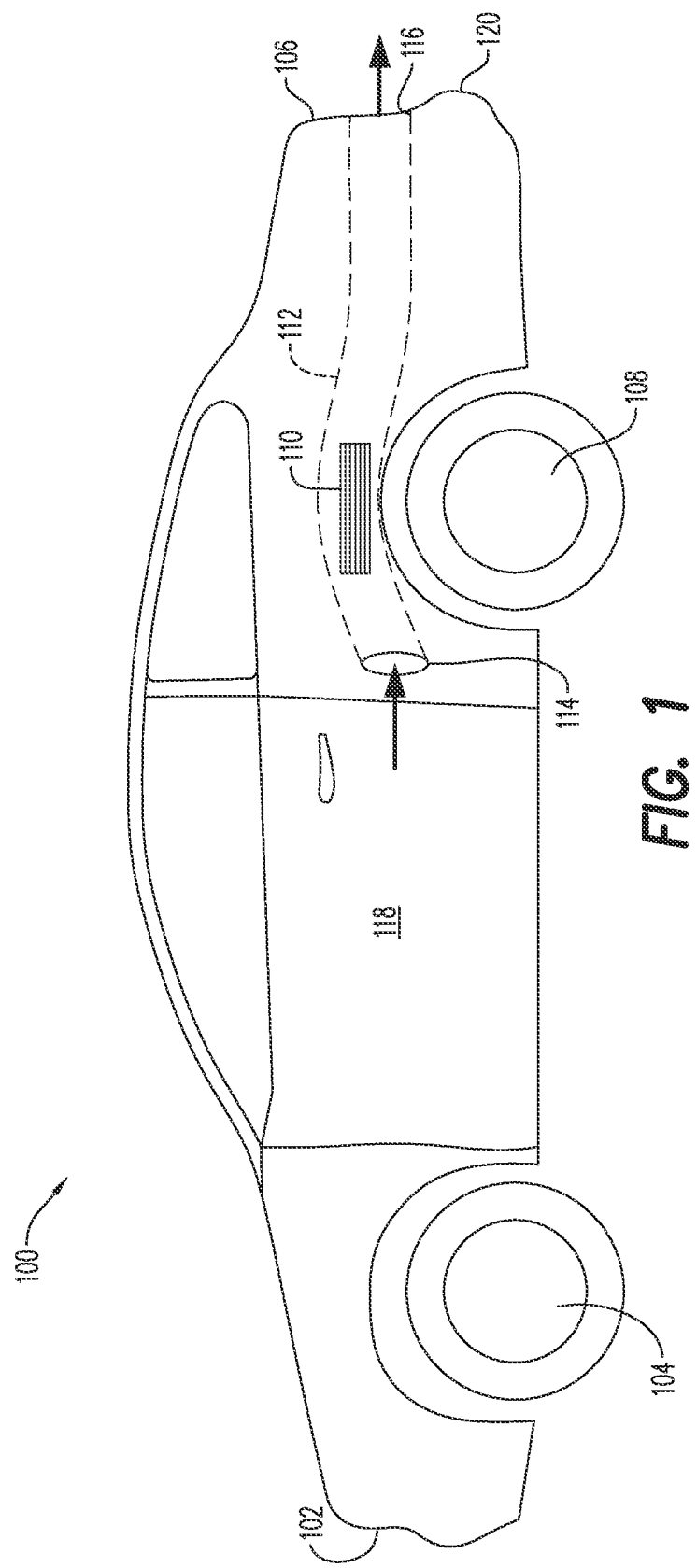
FIG. 1 is a representative view of an example embodiment of a heat exchanger associated with a duct of a vehicle in accordance with aspects of the present disclosure.

Referring now to FIG. 1, an example embodiment of a heat exchanger 110 located within at least one duct or passageway on a side of a motor vehicle 100 is shown. In this embodiment, motor vehicle 100 includes a front end 102 and a first set of wheels 104 associated with a front axle of motor vehicle 100 and a rear end 106 located opposite front end 102 and a second set of wheels 108 associated with a rear axle of motor vehicle 100.

In an example embodiment, heat exchanger 110 is located within an interior of a duct 112. Duct 112 is a passageway, channel, or other conduit that is configured to provide a pathway for air entering through an inlet and exiting through an outlet. In some embodiment, duct 112 is oriented approximately along a longitudinal axis of motor vehicle 100 in a direction extending between front end 102 and rear end 106. In this embodiment, duct 112 includes an inlet 114 on one side of motor vehicle 100 that provides an opening to the interior of duct 112. Duct 112 also includes an outlet 116 that is located rearward of inlet 114 and that provides an exit for the air flowing through the interior of duct 112.

In an example embodiment, inlet 114 of duct 112 is located in front of second set of wheels 108 associated with the rear axle of motor vehicle 100 and outlet 116 of duct 112 is located behind or rearward of second set of wheels 108 associated with the rear axle. In some embodiments, inlet 114 of duct 112 may be located in front of second set of wheels 108 and behind or rearward of a door 118 of motor vehicle 100. In other embodiments, the inlet may be located elsewhere on vehicle. For example, in some cases, the inlet may be located behind second set of wheels 108. In some other embodiments, the inlet may be located closer towards front end 102 of vehicle 100. For example, in some cases, the inlet may be located in front of door 118 of vehicle 100.

In some embodiments, outlet 116 of duct 112 may be located at rear end 106 of motor vehicle 100, for example, near or adjacent to a rear bumper 120 of motor vehicle 100. For example, as shown in FIG. 1, outlet 116 of duct 112 is located above rear bumper 120. In other embodiments, as will be described below, outlet 116 may be located elsewhere at rear end 106 of motor vehicle 100.

Figure 2:
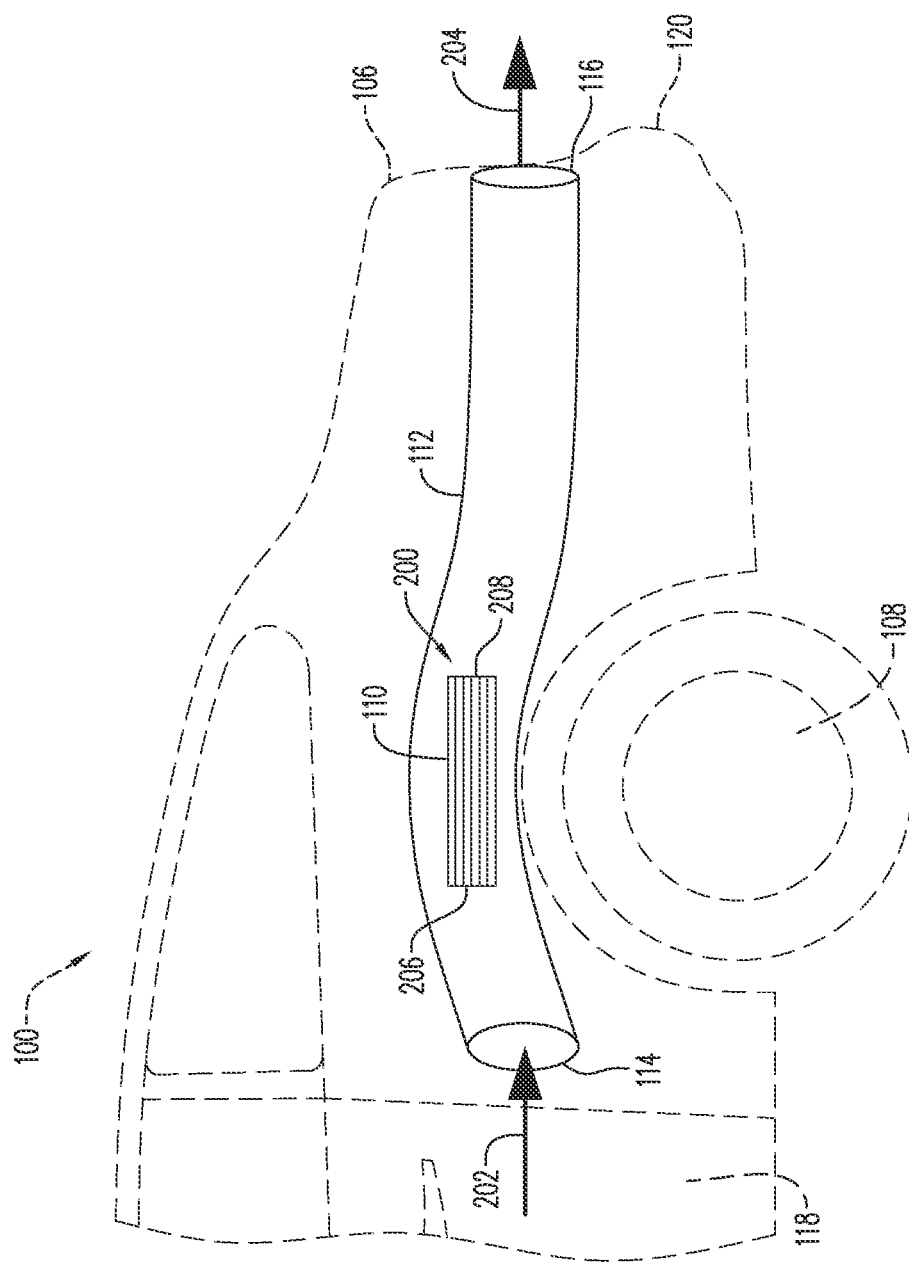
FIG. 2 is an enlarged view of an example embodiment of a heat exchanger disposed inside a duct of a vehicle in accordance with aspects of the present disclosure.

Referring now to FIG. 2, an enlarged view of heat exchanger 110 disposed inside duct 112 on one side of motor vehicle 100 is shown. As shown in FIG. 2, heat exchanger 110 is positioned within an interior of duct 112 having inlet 114 arranged on a side of motor vehicle 100 such that air flowing through duct 112 travels over a portion of heat exchanger 110 that has an outer surface 200 that is exposed to the interior of duct 112. That is, an airflow pathway is defined such that air flows through inlet 114 into duct 112 (e.g., oncoming airflow 202), along outer surface 200 of heat exchanger 110 located inside duct 112, and exits duct 112 through outlet 116 (e.g., outgoing airflow 204) located at rear end 106 of motor vehicle 100. With this arrangement, heat exchanger 110 positioned within duct 112 may act to cool various systems and/or components of vehicle 100.

As described herein, heat exchanger 110 is a surface heat exchanger that is configured to transfer heat to air flowing along its surface, for example, through interaction between the flowing air and a plurality of fins or other heat transfer elements on the surface heat exchanger. This configuration of surface heat exchanger 110 is in contrast to a flow-through type heat exchanger, such as conventional radiators used in motor vehicles, that transfer heat to air flowing or passing through the radiator.

Surface heat exchanger 110 of the present embodiments is arranged substantially parallel to a direction of oncoming airflow, whereas conventional flow-through radiators are arranged perpendicular to a direction of the oncoming airflow. For example, in the case of a motor vehicle (e.g., motor vehicle 100) traveling in a forward direction, surface heat exchanger 110 is arranged longitudinally (e.g., in a direction oriented along the longitudinal axis of motor vehicle 100 in a direction extending between front end 102 and rear end 106) so as to be substantially parallel to the oncoming airflow as the motor vehicle moves in the forward direction. Conventional flow-through radiators are arranged latitudinally (e.g., in a transverse direction extending between opposite sides of the motor vehicle) to be substantially perpendicular to the oncoming airflow as the motor vehicle moves in the forward direction so as to allow air to flow through the radiator.

As shown in FIG. 2, heat exchanger 110 is arranged within the interior of duct 112 with a longitudinal orientation with a first end 206 of heat exchanger 110 located forward of a second end 208 (i.e., first end 206 of heat exchanger 110 is closer towards front end 102 of motor vehicle 100 and second end 208 of heat exchanger 110 is closer towards rear end 106 of motor vehicle 100). With this orientation within duct 112, heat exchanger 110, including outer surface 200, is aligned substantially parallel to oncoming airflows entering into inlet 114 of duct 112 and flowing along outer surface 200 of heat exchanger 110.

In this embodiment, duct 112 has a curved or bent shape configured to route duct 112 over and/or around components of motor vehicle 100, such as second set of wheels 108 associated with the rear axle. However, in other embodiments, the shape or configuration of duct 112 may be straight or have another shape to route duct 112 over, under, around, and/or through various components of motor vehicle 100. In example embodiments, heat exchanger 110 disposed within duct 112 may have a shape that conforms and corresponds with the shape of duct 112. For example, in cases where duct 112 is curved or bent, heat exchanger 110 may also have a corresponding curved or bent shape to conform to the shape of duct 112. In other embodiments where duct 112 has different shapes, heat exchanger 110 may have a correspondingly similar shape.

In some embodiments, the techniques of the example embodiments described herein may be used to provide cooling and/or temperature regulation for a variety of different systems and components associated with a vehicle. In an example embodiment, a heat exchanger according to the example embodiments (e.g., heat exchanger 110) may be used as part of a vehicle fluid coolant system to provide supplemental heat transfer capabilities to a vehicle's engine or other driveline components, such as a transmission. In other embodiments, a heat exchanger according to the example embodiments (e.g., heat exchanger 110) may be used as a heat sink that is directly in contact with a vehicle component to provide heat transfer capabilities to that component without use of a cooling fluid. Additionally, in some embodiments, the heat exchanger may be used in combination with another heat exchanger, such as a main radiator of a vehicle, to provide additional or supplemental heat transfer functionality.

In other embodiments, a heat exchanger may be used in connection with other vehicle systems and/or components that employ heat transfer techniques. For example, in some embodiments, a heat exchanger as described herein may be used as part of an air conditioning or HVAC system to provide supplemental cooling or temperature regulation capacity to a vehicle's interior cabin or passenger compartment. In still other embodiments, a heat exchanger may be used as part of a battery cooling and/or temperature regulation system, for example, in an electric or hybrid vehicle, to provide additional or supplemental heat transfer capabilities to assist with regulating the temperature of the vehicle's batteries, motors, and/or inverters.

It should be understood that other embodiments may use one or more heat exchangers described herein to provide cooling or heat transfer capabilities to any component of a vehicle that may need cooling or heat transfer, including, for example, components located adjacent to one or more ducts on the side of the vehicle, such as brake components, suspension components, driveline components, and various processors and/or computers associated with components of the vehicle.

Although the heat exchanger described herein may also be referred to as a surface radiator or surface heat exchanger, it is not limited to the functionality of a conventional radiator. For example, it is possible that in one or more modes of operation, the heat exchanger according to the example embodiments may function as a condenser in a cooling circuit, or an evaporator in a heating circuit.

Referring now to FIGS. 3A-3C, an example embodiment of surface heat exchanger 110 having an approximately rectangular shape is shown. While the example embodiments illustrate an approximately rectangular shape for heat exchanger 110, it should be understood that heat exchanger 110 may have any shape.

FIG. 3A is an isometric top view showing heat exchanger 110 in greater detail. In one embodiment, heat exchanger 110 is made from aluminum, but other materials could of course also be used. FIG. 3A shows a top portion 300 of heat exchanger 100 including outer surface 200 that is disposed opposite a bottom portion 302 including an inner surface 304.

In an example embodiment, outer surface 200 of heat exchanger 110 includes a plurality of upstanding, outwardly projecting members or fins 310 which assist in optimizing the air flow surface area over heat exchanger 110. As shown in FIG. 3A, plurality of fins 310 define straight, continuous members that are generally parallel to one another and have a predetermined spacing therebetween.

Referring now to FIG. 3B, an enlarged view of plurality of fins 310 is shown. In this embodiment, adjacent fins of plurality of fins 310 are separated by a channel of a plurality of channels 312. In an example embodiment, plurality of fins 310 are substantially aligned along a direction corresponding to an airflow direction of air moving through duct 112 as vehicle 100 moves in a forward direction (e.g., plurality of fins 310 are approximately parallel to the direction of airflow through duct 112).

Fins 310 may be cast aluminum but other materials and/or manufacturing processes, such as extruding and machining, could also be used. In order to further reduce drag, a front or leading edge 314 of each fin of plurality of fins 310 may have an angled configuration to guide the air flow along outer surface 200 of heat exchanger 110 in a smooth manner (i.e., so as to not disrupt the airflow). With this arrangement, reducing the drag, including the drag over heat exchanger 110, thereby increases the aerodynamic performance of vehicle 100. In some embodiments, a rear or trailing edge of fins 310 (e.g., opposite leading edge 314) may have a square perpendicular edge.

FIG. 3C is an isometric underside or bottom view showing heat exchanger 110 in greater detail. In this embodiment, bottom portion 302 of heat exchanger 110 including inner surface 304 is shown. In an example embodiment, inner surface 304 includes a plurality of heat transfer fluid passages 316. Plurality of fluid passages 316 may one or more tubes or other conduits that are arranged along bottom portion 302 of heat exchanger 110. Plurality of heat transfer fluid passages 316 are configured for the heat transfer fluid or cooling fluid (e.g., coolant) to flow through as air passes over fins 310 on top portion 300 of heat exchanger 110. In some cases, the heat transfer fluid or cooling fluid may be a liquid. In other cases, the heat transfer fluid or cooling fluid may be a vapor or gas.

As shown in the illustrated embodiment of FIG. 3C, heat transfer fluid passages 316 are arranged in an approximately serpentine pattern on bottom portion 302 of heat exchanger 110 and guide the cooling fluid via an inlet 318 to an outlet 320 forming a cooling fluid flow circuit configured to transfer heat from the cooling fluid to oncoming air passing over plurality of fins 310 located above fluid passages 316 on top portion 300 of heat exchanger 110 while the vehicle (e.g., vehicle 100) is in motion.

When installed within the interior of duct 112 of vehicle 100, inner surface 304 of heat exchanger 110 will be facing towards the interior surface of duct 112 and outer surface 200 of heat exchanger 110 will be facing away from the interior surface of duct 112 so that outer surface 200, including plurality of fins 310, is exposed to the airflow pathway through the interior of duct 112. With this arrangement, plurality of fins 310 may act to transfer heat from the cooling fluid flowing through fluid passages 316 to air moving along outer surface 200, thereby providing additional or supplemental cooling or temperature regulation to vehicle systems and/or components.

Figure 4:
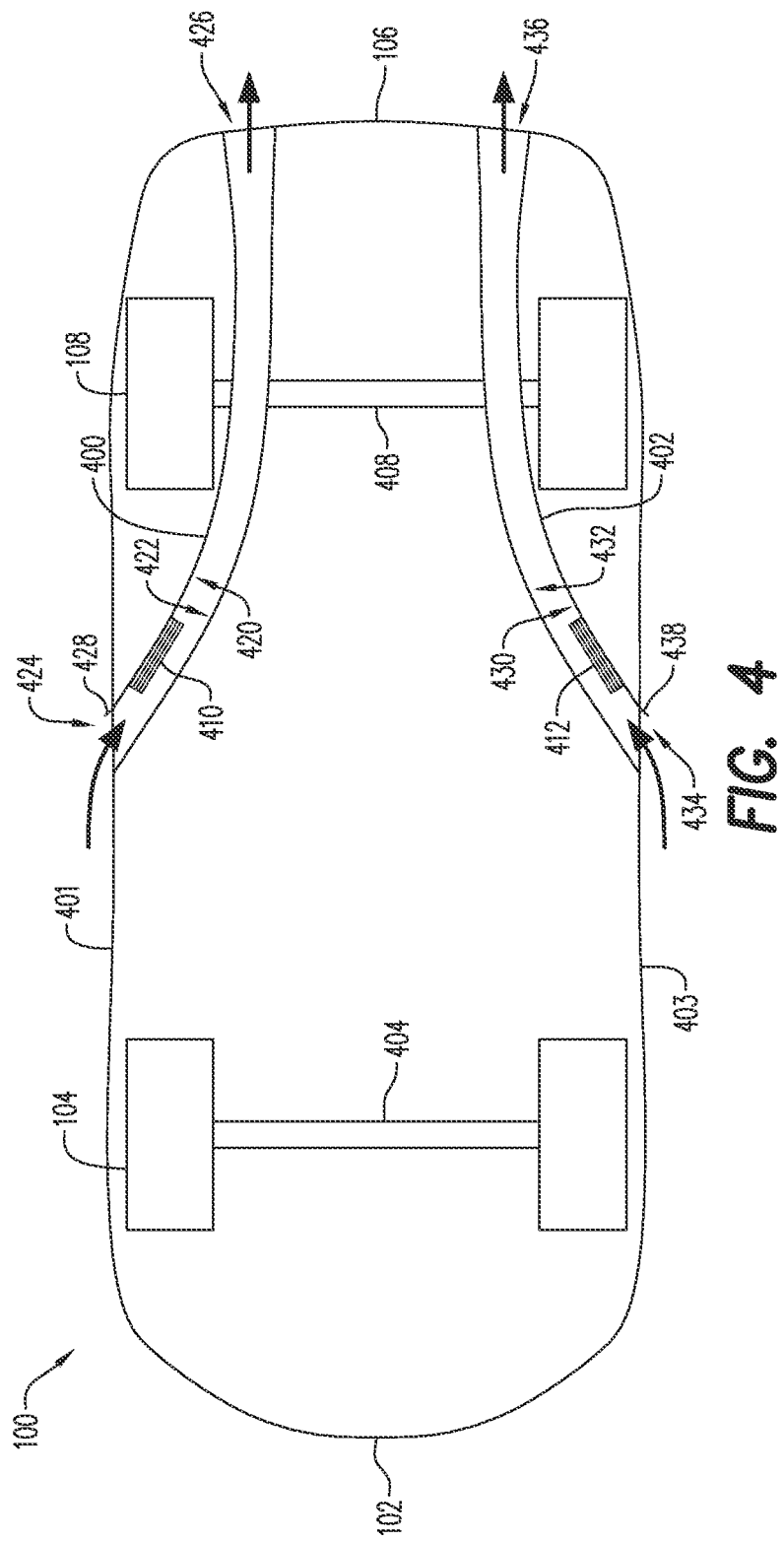
FIG. 4 is a top schematic view of an example embodiment of a heat exchanger associated with an outboard side of a duct of a vehicle in accordance with aspects of the present disclosure.

In some embodiments, a heat exchanger may be positioned within the ducts of a vehicle at a location that is configured to optimize or maximize the amount or intensity of the airflow passing through the interior of the ducts as the vehicle is moving. Referring now to FIG. 4, a top schematic view of an example embodiment of heat exchangers associated with an outboard side of ducts of vehicle 100 is shown in accordance with aspects of the present disclosure. In this embodiment, vehicle 100 includes two ducts, including a first duct 400 located on a first side 401 of vehicle 100 and a second duct 402 located on a second side 403 of vehicle 100. First duct 400 includes a first heat exchanger 410 disposed within the interior of first duct 400 and second duct 402 includes a second heat exchanger 412 disposed within the interior of second duct 402.

As described above with reference to FIG. 1, each of the ducts are positioned on the sides of motor vehicle 100 with an inlet between first set of wheels 104 associated with a front axle 404 of motor vehicle 100 and second set of wheels 108 associated with a rear axle 408 of motor vehicle 100. For example, as shown in FIG. 4, a first inlet 424 of first duct 400 on first side 401 of motor vehicle 100 provides an opening to the interior of first duct 400. First duct 400 also includes a first outlet 426 that is located rearward of first inlet 424 and that provides an exit for the air flowing through the interior of first duct 400. In this embodiment, first inlet 424 of first duct 400 is located in front of second set of wheels 108 associated with rear axle 408 of motor vehicle 100 and first outlet 426 of first duct 400 is located behind or rearward of second set of wheels 108 associated with rear axle 408. In some embodiments, first outlet 426 of first duct 400 may be located at rear end 106 of motor vehicle 100.

In this embodiment, second duct 402 has a substantially similar arrangement on the opposite second side 403 of motor vehicle 100. For example, as shown in FIG. 4, a second inlet 434 of second duct 402 on second side 403 of motor vehicle 100 provides an opening to the interior of second duct 402. Second duct 402 also includes a second outlet 436 that is located rearward of second inlet 434 and that provides an exit for the air flowing through the interior of second duct 402. In this embodiment, second inlet 434 of second duct 402 is located in front of second set of wheels 108 associated with rear axle 408 of motor vehicle 100 and second outlet 436 of second duct 402 is located behind or rearward of second set of wheels 108 associated with rear axle 408. In some embodiments, second outlet 436 of second duct 402 may be located at rear end 106 of motor vehicle 100.

In this embodiment, each of the two heat exchangers, including first heat exchanger 410 and second heat exchanger 412, are arranged or positioned on an outboard side of the interior of the ducts on the sides of vehicle 100. For example, as shown in FIG. 4, first duct 400 includes an outboard interior side 420 and an opposite inboard interior side 422. Outboard interior side 420 of first duct 400 is closer to first side 401 of motor vehicle 100 than inboard interior side 422. Similarly, second duct 402 includes an outboard interior side 430 and an opposite inboard interior side 432. Outboard interior side 430 of second duct 402 is closer to second side 403 of motor vehicle 100 than inboard interior side 432. As shown in FIG. 4, first heat exchanger 410 is positioned on outboard interior side 420 of first duct 400 and second heat exchanger 412 is positioned on outboard interior side 430 of second duct 402. It should be understood that a heat exchanger according to the example embodiments described herein may be arranged at any location along the length of the ducts, for example, forward, rearward, and/or along the rear axle. With this arrangement, the outer surfaces of each of first heat exchanger 410 and second heat exchanger 412 are facing towards the center of motor vehicle 100 and each other.

In some cases, the ducts on the sides of vehicle 100 (e.g., first duct 400 and/or second duct 402) may include a side scoop or other mechanism located at the periphery of the inlet that is configured to channel or direct air flowing over the sides of motor vehicle 100 into the corresponding duct. For example, as shown in FIG. 4, a first side scoop 428 extends outward from first side 401 of motor vehicle 100 at the periphery of first inlet 424 (e.g., on outboard side 420 of first duct 400) to direct air into the interior of first duct 400. Similarly, a second side scoop 438 extends outward from second side 403 of motor vehicle 100 at the periphery of second inlet 434 (e.g., on outboard side 430 of second duct 402) to direct air into the interior of second duct 402.

Figure 5:
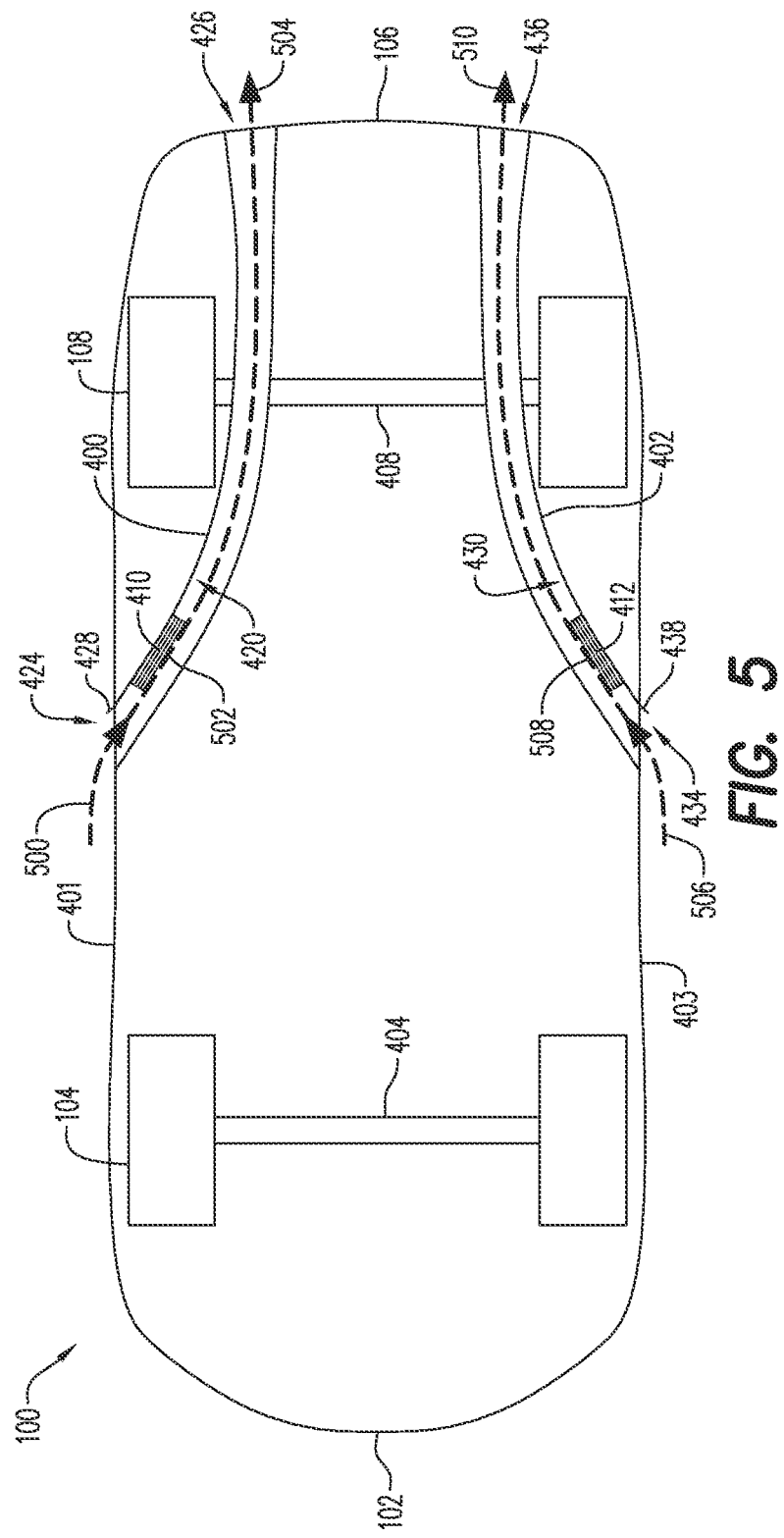
FIG. 5 is a top schematic view illustrating airflows through an example embodiment of a heat exchanger associated with an outboard side of a side duct of a vehicle.

Referring now to FIG. 5, a top schematic view illustrating airflows through the heat exchangers positioned within outboard sides of the interior of the side ducts of motor vehicle 100 is shown. In an example embodiment, an airflow pathway through first duct 400 on first side 401 of motor vehicle 100 is defined such that air flows through first inlet 424 into first duct 400 (e.g., oncoming airflow 500), along an outer surface 502 of first heat exchanger 410 located on outboard side 420 within the interior of first duct 400, and exits first duct 400 through first outlet 426 (e.g., outgoing airflow 504) located at rear end 106 of motor vehicle 100. Similarly, an airflow pathway through second duct 402 on second side 403 of motor vehicle 100 is defined such that air flows through second inlet 434 into second duct 402 (e.g., oncoming airflow 506), along an outer surface 508 of second heat exchanger 412 located on outboard side 430 within the interior of second duct 402, and exits second duct 402 through second outlet 436 (e.g., outgoing airflow 510) located at rear end 106 of motor vehicle 100.

Figure 3:
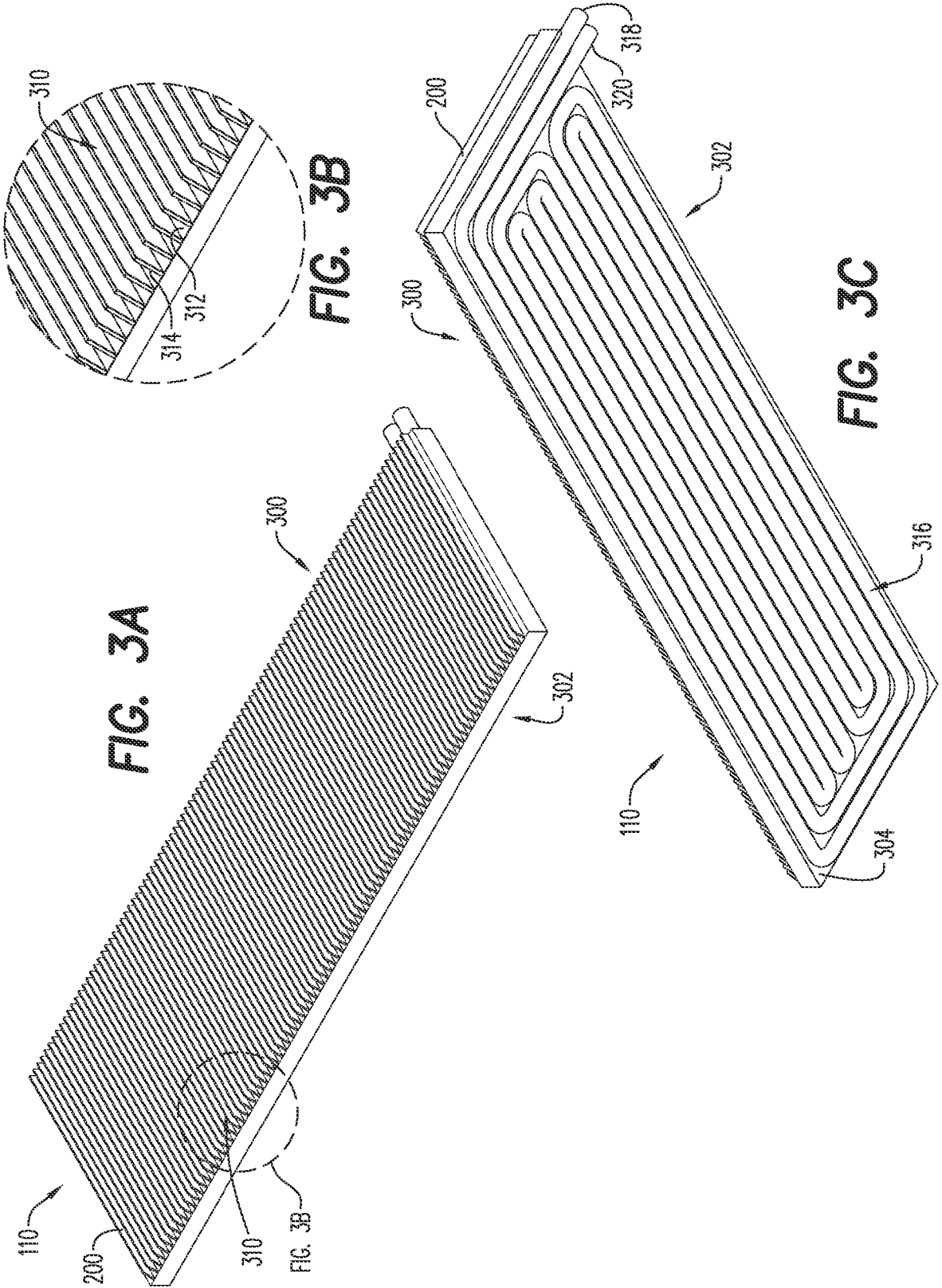
FIG. 3A is an isometric view of a heat exchanger in accordance with aspects of the present disclosure.
FIG. 3B is an enlarged view of a portion of the heat exchanger shown in FIG. 3A showing a plurality of fins.
FIG. 3C is an isometric underside view of the heat exchanger of FIG. 3A in accordance with aspects of the present disclosure.

In this embodiment, oncoming airflows 500, 506 interact with the plurality of fins on the outer surfaces 502, 508 of the heat exchangers 410, 412 to transfer heat from the heat exchangers 410, 412 (e.g., via heated coolant flowing through plurality of heat transfer fluid passages 316 on bottom portion 302 of heat exchanger 100, as shown in FIG. 3 or via heat sink action from a vehicle component) to oncoming airflows 500, 506. After having passed through the fins on the outer surfaces 502, 508 of the heat exchangers 410, 412, outgoing airflows 504, 510 have absorbed a portion of the heat from heat exchangers 410, 412 such that outgoing airflows 504, 510 are warmer than oncoming airflows 500, 506.

By providing ducts 400, 402 on the sides of motor vehicle 100 and positioning heat exchangers 410, 412 within the interior of the ducts 400, 402 as air is configured to flow along the outer surfaces 502, 508 of heat exchangers 410, 412 while motor vehicle 100 is moving. The position of heat exchangers 410, 412 on the outboard sides 420, 430 of the ducts 400, 402 of vehicle 100 maximizes or optimizes the amount or intensity of the air passing over outer surfaces 502, 508 of heat exchangers 410, 412 as the airflows 500, 506 travel through the interior of the ducts 400, 402 as vehicle 100 is moving. Through this mechanism, the fluid in heat exchangers 410, 412 is cooled by action of heat transfer to airflows 500, 506, thereby cooling the fluid (e.g., coolant), which is returned back to the corresponding vehicle system or component to provide heat transfer function. Alternatively, in the case of a heat exchanger that is configured as a heat sink, the heat transferred to heat exchangers 410, 412 from the corresponding vehicle components is transferred to airflows 500, 506, thereby cooling the vehicle components connected to heat exchangers 410, 412. With this arrangement, heat exchangers 410, 412 positioned within ducts 400, 402 may act to cool various systems and/or components of vehicle 100.

Figure 6:
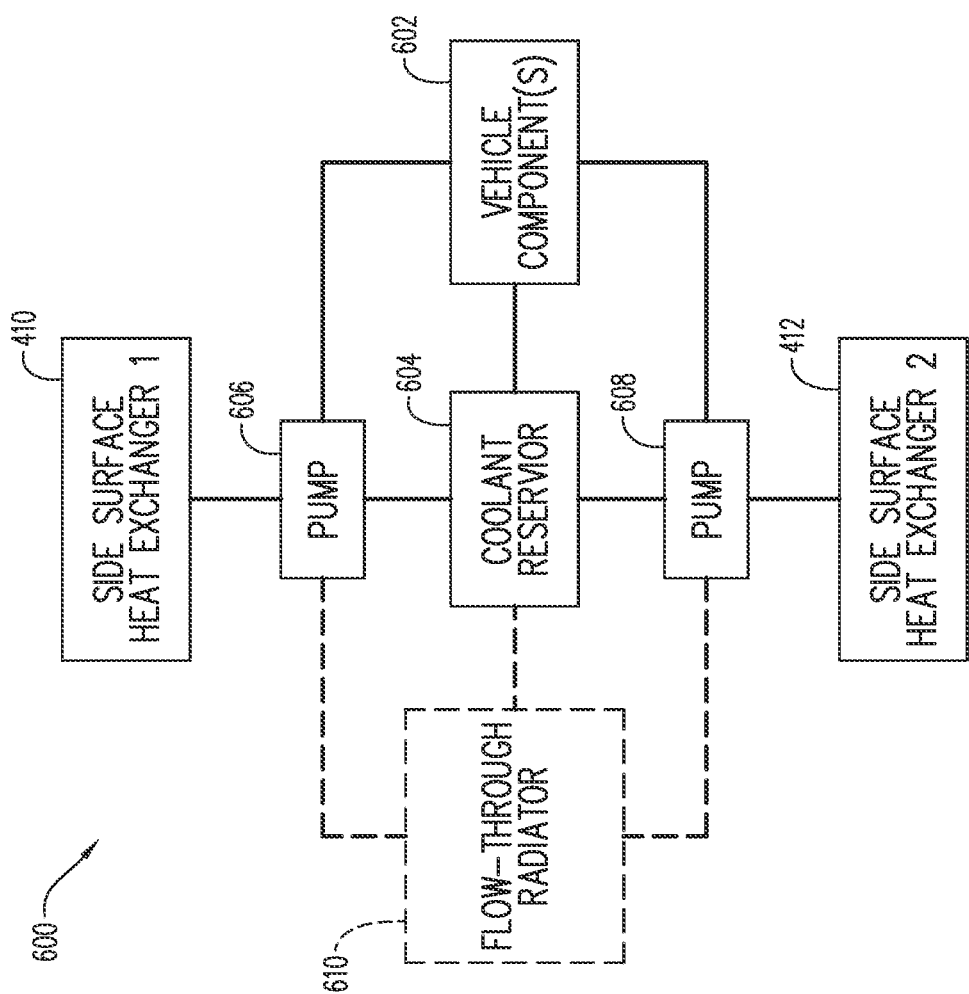
FIG. 6 is a block diagram of an example embodiment of a heat transfer system for a vehicle fluid coolant system that includes one or more heat exchangers in a duct of a vehicle in accordance with aspects of the present disclosure.

Referring now to FIG. 6, an example embodiment of a heat transfer system for a vehicle fluid coolant system 600 in accordance with aspects of the present disclosure is shown. In some embodiments, at least one heat exchanger associated with a side duct of a vehicle may be part of vehicle fluid coolant system 600. In an example embodiment, vehicle fluid coolant system 600 may include at least two heat exchangers, each disposed within a side duct on either side of the vehicle. For example, in this embodiment, vehicle fluid coolant system 600 includes first heat exchanger 410 disposed within the interior of first duct 400 and second heat exchanger 412 disposed within the interior of second duct 402.

In some embodiments, vehicle fluid coolant system 600 may be configured to provide cooling and/or temperature regulation to one or more components 602 of a vehicle (e.g., motor vehicle 100). For example, vehicle components 602 may include one or more of a vehicle engine or motor, transmission, batteries, inverters, computers, processors, or any other component within the vehicle.

In some embodiments, vehicle fluid coolant system 600 may also include at least a heat transfer fluid reservoir, for example, a coolant reservoir 604, and one or more pumps configured to move the heat transfer fluid (e.g., coolant) through vehicle fluid coolant system 600. In an example embodiment, vehicle fluid coolant system 600 employs a heat transfer fluid of some type, such as a fluid commonly referred to as engine coolant or antifreeze. Engine coolant or antifreeze may include several different varieties of ingredients, but generally may include ethylene or propylene glycol and water. In other embodiments, other types of heat transfer fluid may be used, for example, depending on the type of heat transfer system. For example, an air conditioning system may use Freon, R-134A, or other types of refrigerants for a heat transfer fluid. Other embodiments may similarly use heat transfer fluids that are specific to the particular configuration of the heat transfer system.

In this embodiment, the coolant used as the heat transfer fluid for vehicle fluid coolant system 600 may be stored or held in coolant reservoir 604. Coolant reservoir 604 may be a container of any type or shape within the engine compartment or other location on the vehicle that is configured to hold or store the coolant or other heat transfer fluid used by vehicle fluid coolant system 600. Additionally, in one example embodiment, vehicle fluid coolant system 600 may also include at least one pump for each surface heat exchanger (e.g., first heat exchanger 410 and second heat exchanger 412), including a first pump 606 associated with first heat exchanger 410 and a second pump 608 that is associated with second heat exchanger 412. First pump 606 and second pump 608 are configured to move the coolant through vehicle fluid coolant system 600 so that the coolant circulates through each of the components, including, but not limited to vehicle components 602, coolant reservoir 604, first heat exchanger 410 and second heat exchanger 412. In other embodiments, a single pump may be used to move fluid through both surface heat exchangers (e.g., first heat exchanger 410 and second heat exchanger 412).

For example, by way of action of pumps 606, 608, coolant may move through vehicle fluid coolant system 600 from coolant reservoir 604 through various fluid conduits and passages (not shown) that are in fluid communication with vehicle components 602, coolant reservoir 604, first heat exchanger 410 and second heat exchanger 412. Coolant passing through vehicle components 602 absorbs heat from the components and passes to first heat exchanger 410 and/or second heat exchanger 412 where the heated coolant transfers the absorbed heat to the cooler surrounding atmosphere, thereby cooling the coolant. The cooled coolant returns back to the coolant reservoir 604 where it may be cycled back through vehicle components 602 to once again absorb heat. With this arrangement, vehicle fluid coolant system 600 may act to transfer heat from vehicle components 602 in order for cooling and/or temperature regulation.

In some cases, vehicle fluid coolant system 600 may also include at least a main flow-through type heat exchanger, for example, a flow-through radiator 610. Main flow-through radiator 610 may be configured to provide heat transfer functions to help regulate the temperature of vehicle components 602, such as an engine or motor. For example, main flow-through radiator 610 may typically be located at the front of the vehicle (e.g., at front end 102 of motor vehicle 100) and is arranged such that air passes through front grille openings at the front of the vehicle to flow or pass through main flow-through radiator 610 in a crossflow or substantially perpendicular manner.

Figure 7:
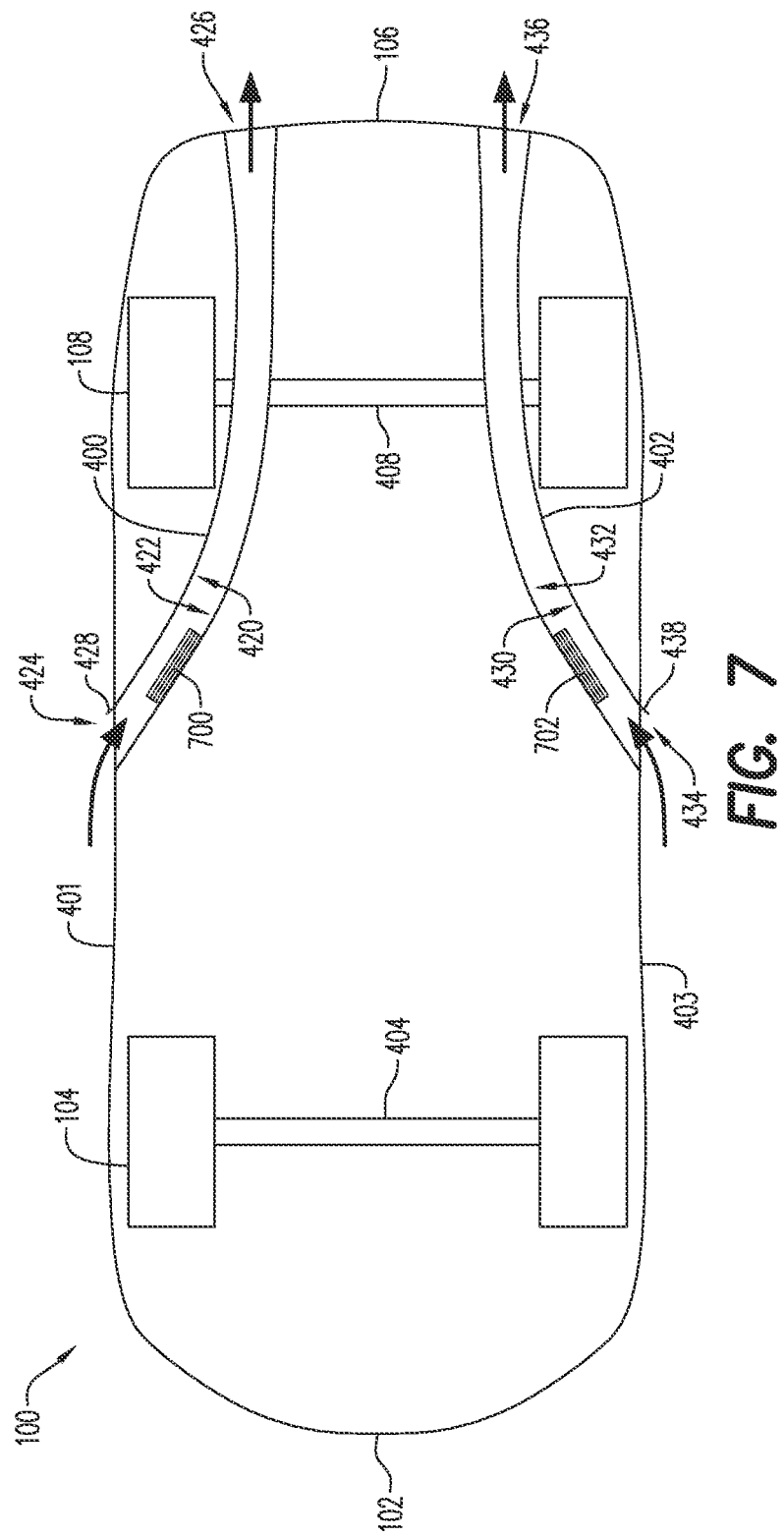
FIG. 7 is a top schematic view of an example embodiment of a heat exchanger associated with an inboard side of a duct of a vehicle in accordance with aspects of the present disclosure.

In different embodiments, one or more heat exchangers may be positioned at various locations within the interior of one or more ducts of a vehicle. Referring now to FIG. 7, a top schematic view of an example embodiment of heat exchangers associated with an inboard side of ducts 400, 402 of vehicle 100 (as described above in reference to FIG. 4) is shown in accordance with aspects of the present disclosure. In this embodiment, first duct 400 includes a first heat exchanger 700 disposed within the interior of first duct 400 and second duct 402 includes a second heat exchanger 700 disposed within the interior of second duct 402. In this embodiment, each of the two heat exchangers, including first heat exchanger 700 and second heat exchanger 702, are arranged or positioned on an inboard side of the interior of the ducts of vehicle 100.

For example, as shown in FIG. 7, first duct 400 includes outboard interior side 420 and an opposite inboard interior side 422. Outboard interior side 420 of first duct 400 is closer to first side 401 of motor vehicle 100 than inboard interior side 422. Similarly, second duct 402 includes outboard interior side 430 and an opposite inboard interior side 432. Outboard interior side 430 of second duct 402 is closer to second side 403 of motor vehicle 100 than inboard interior side 432. As shown in FIG. 7, first heat exchanger 700 is positioned on inboard interior side 422 of first duct 400 and second heat exchanger 702 is positioned on inboard interior side 432 of second duct 402. With this arrangement, the outer surfaces of each of first heat exchanger 700 and second heat exchanger 702 are facing away from the center of motor vehicle 100 and each other (i.e., the outer surface of first heat exchanger 700 faces outward towards first side 401 of vehicle 100 and the outer surface of second heat exchanger 702 faces outwards towards second side 403 of vehicle 100).

With this arrangement, airflows passing through first duct 400 and second duct 402 pass over the outer surface of first heat exchanger 700 on inboard side 422 of first duct 400 and the outer surface of second heat exchanger 702 on inboard side 432 of second duct 402 in a similar manner as the airflows 500, 506 described above with reference to FIG. 5. Additionally, the inboard position of first heat exchanger 700 and second heat exchanger 702 may be configured to locate the heat exchangers near or adjacent to vehicle components disposed in the center of vehicle 100. Other arrangements of one or more heat exchangers within the interior of the ducts are shown with reference to FIGS. 11A through 11I and described below.

Figure 8:
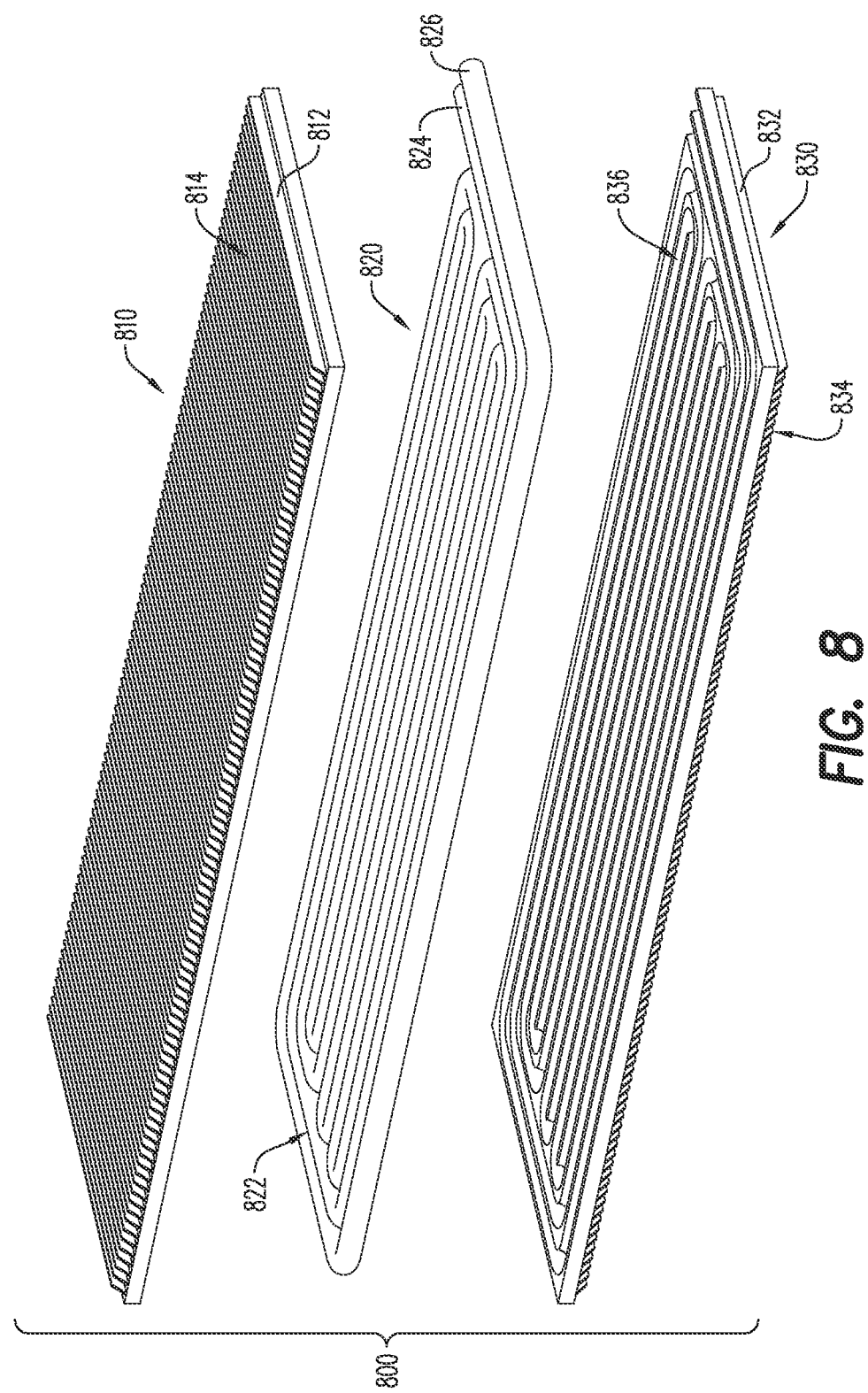
FIG. 8 is an exploded isometric view of another embodiment of a heat exchanger having top and bottom fin surfaces in accordance with aspects of the present disclosure.

In some embodiments, an alternate embodiment of a heat exchanger having a plurality of fins on both the top and bottom sides (e.g. a dual-sided heat exchanger) may be positioned within one or more ducts of a vehicle. Referring now to FIG. 8, an exploded isometric view of an alternate embodiment of a dual-sided heat exchanger 800 having top and bottom fin surfaces in accordance with aspects of the present disclosure is shown. In this embodiment, dual-sided heat exchanger 800 includes an upper portion 810 with a first outer surface 812 having a plurality of fins 814. Plurality of fins 814 may have a substantially similar configuration, shape, and/or arrangement as plurality of fins 310, described above in reference to FIGS. 3A-3B.

In this embodiment, dual-sided heat exchanger 800 further includes a middle portion 820. Middle portion 820 includes a plurality of heat transfer fluid passages 822. Plurality of fluid passages 822 include one or more tubes or other conduits that are arranged along middle portion 820 of dual-sided heat exchanger 800. Plurality of heat transfer fluid passages 822 may have a substantially similar configuration, shape, and/or arrangement as plurality of fluid passages 316, described above in reference to FIG. 3C, and are configured for the heat transfer fluid or cooling fluid (e.g., coolant) to flow through as air passes over upper and lower portions of dual-sided heat exchanger 800.

In this embodiment, dual-sided heat exchanger 800 further includes a lower portion 830 with a second outer surface 832. Lower portion 830 is substantially similar to upper portion 810 located on the opposite side of dual-sided heat exchanger 800. Second outer surface 832 of lower portion 830 includes a plurality of fins 834 that have a substantially similar configuration, shape, and/or arrangement as plurality of fins 814, 310, described above and in reference to FIGS. 3A-3B. As can be seen in FIG. 8, a top side of lower portion 830 of dual-sided heat exchanger 800 includes a plurality of channels 836 that are configured to receive and correspond with the serpentine shape of plurality of heat transfer fluid passages 822 of middle portion 820. With this arrangement, plurality of heat transfer fluid passages 822 may fit into and be in contact with plurality of channels 836 to assist with heat transfer from the heated fluid flowing through heat transfer fluid passages 822 to plurality of fins 834.

As shown in the embodiment of FIG. 8, fluid passages 822 are arranged in an approximately serpentine pattern on middle portion 820 of dual-sided heat exchanger 800 and guide the cooling fluid via an inlet 824 to an outlet 826 forming a cooling fluid flow circuit configured to transfer heat from the cooling fluid while the vehicle (e.g., vehicle 100) is in motion to oncoming air passing over plurality of fins 814 located above fluid passages 822 on upper portion 810 of dual-sided heat exchanger 800, as well as over plurality of fins 834 located below fluid passages 822 on lower portion 830 of dual-sided heat exchanger 800.

Additionally, in some embodiments, a bottom side of upper portion 810 may have a substantially similar plurality of channels as channels 836 that are also configured to receive and correspond with the serpentine shape of plurality of heat transfer fluid passages 822 of middle portion 820. With this arrangement, plurality of heat transfer fluid passages 822 may fit into and be in contact with plurality of channels on both upper portion 810 and lower portion 830 of dual-sided heat exchanger 800 to further assist with heat transfer from the heated fluid flowing through heat transfer fluid passages 822 to plurality of fins on the top and bottom sides of dual-sided heat exchanger 800.

Thus, in some embodiments, dual-sided heat exchanger 800 may be more efficient at heat transfer than a heat exchanger having fins only on one side. This feature of dual-sided heat exchanger 800 may allow it to provide a greater heat transfer or cooling capacity than a similarly sized single-sided heat exchanger or may allow it to provide a substantially similar heat transfer or cooling capacity using an overall smaller size and/or surface area, which may allow dual-sided heat exchanger 800 to be located within ducts of a vehicle where there may not otherwise be sufficient space for a larger heat exchanger.

Figure 9:
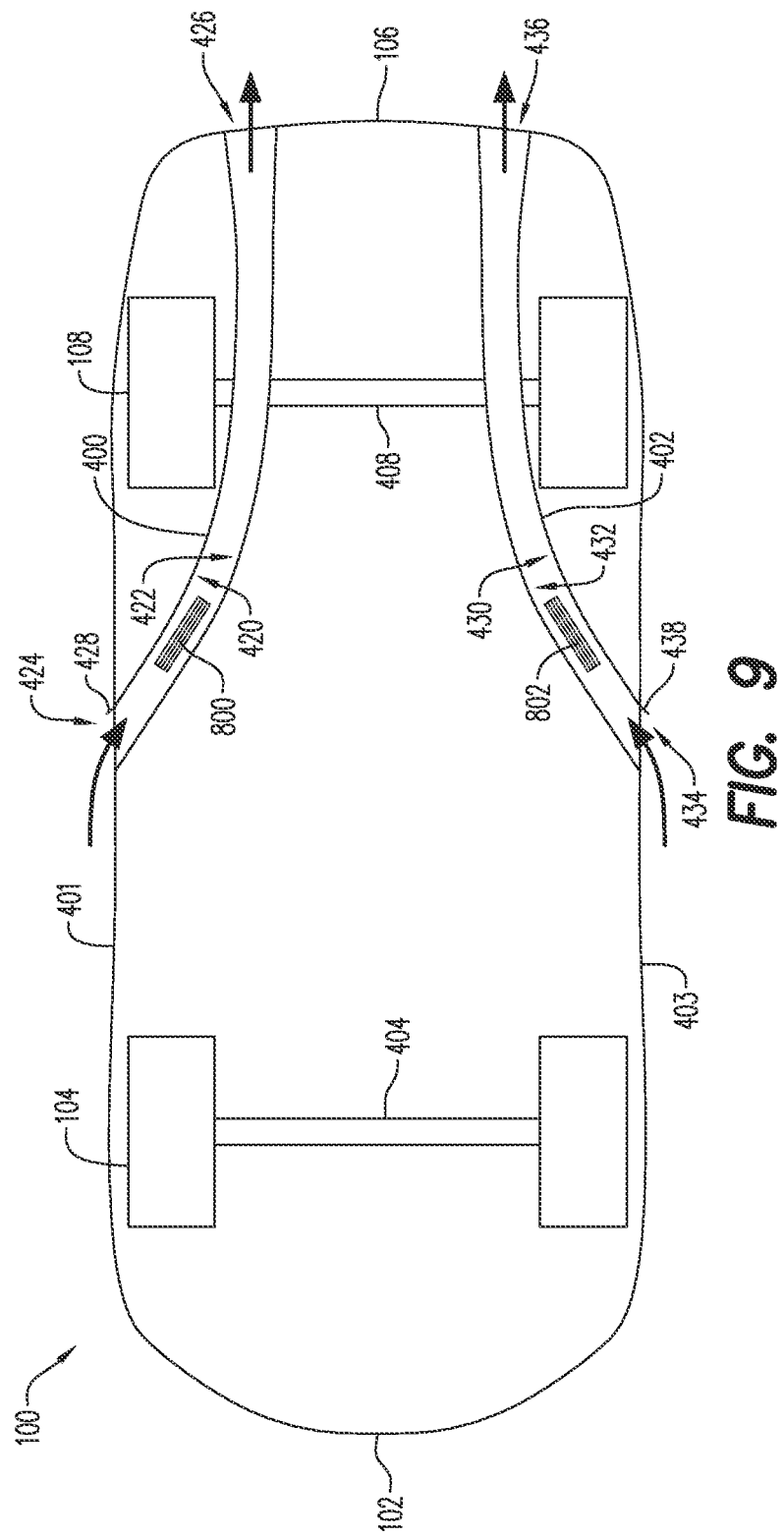
FIG. 9 is a top schematic view of the embodiment of a heat exchanger of FIG. 8 associated with a middle of a duct of a vehicle in accordance with aspects of the present disclosure.

Referring now to FIG. 9, a top schematic view of an example embodiment of dual-sided heat exchangers associated with ducts of vehicle 100 is shown in accordance with aspects of the present disclosure. In this embodiment, vehicle 100 includes first dual-sided heat exchanger 800 disposed within the interior of first duct 400 a second dual-sided heat exchanger 802 disposed within the interior of second duct 402. In this embodiment, dual-sided heat exchangers 800, 802 are positioned approximately within the middle or center of ducts 400, 402. That is, first dual-sided heat exchanger 800 is positioned within the interior of first duct 400 so as to be approximately equidistant from outboard interior side 420 and inboard interior side 422 of first duct 400. Similarly, second dual-sided heat exchanger 802 is positioned within the interior of second duct 402 so as to be approximately equidistant from outboard interior side 430 and inboard interior side 432 of second duct 402.

In an example embodiment, dual-sided heat exchangers 800, 802 may be mounted to a top or bottom side of ducts 400, 402 to position dual-sided heat exchangers 800, 802 centrally within side ducts 400, 402 equidistant from outboard interior sides 420, 430 and inboard interior sides 422, 432. In some embodiments, heat transfer fluid passage lines feeding dual-sided heat exchanger may also be routed through the connection points on the interior sides of the ducts where the dual-sided heat exchanger is mounted to the ducts.

While the embodiment of FIG. 9 illustrates dual-sided heat exchangers 800, 802 approximately equidistant from the interior sides of ducts 400, 402, in other embodiments, dual-sided heat exchangers 800, 802 may be arranged differently. For example, in some embodiments, a dual-sided heat exchanger may be closer to one side of a duct than the opposite side. In another embodiment, a dual-sided heat exchanger may be horizontally disposed in the middle of a duct, thereby splitting the duct into an upper portion and a lower portion so that airflows pass over and under the dual-sided heat exchanger. Additionally, in some embodiments, the dual-sided heat exchanger may be tilted towards one side or the other of the interior of the ducts so as to manipulate the pressure map inside the duct and/or to channel airflows through the duct in a particular manner and/or direction.

Figure 10:
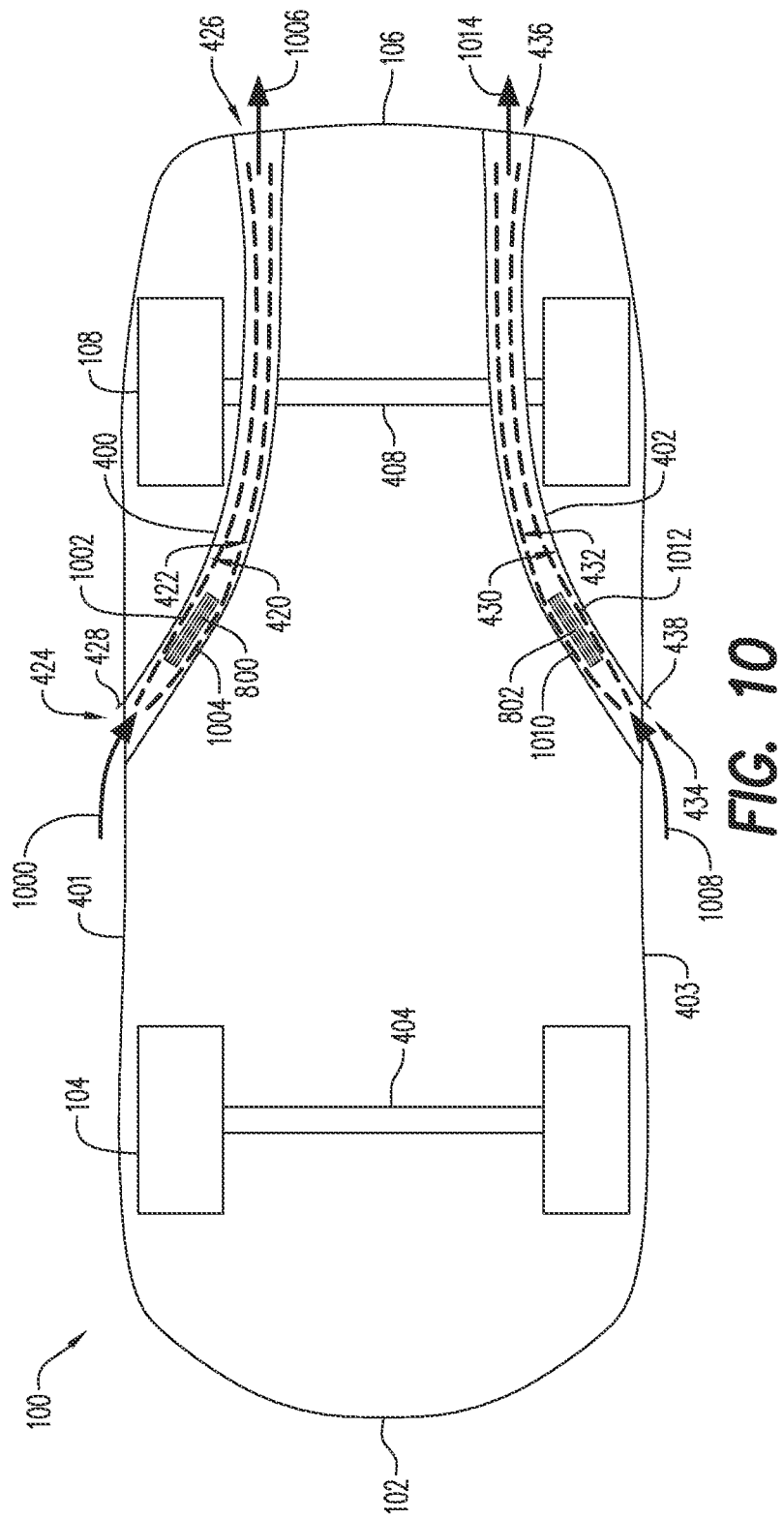
FIG. 10 is a top schematic view illustrating airflows through the embodiment of a heat exchanger of FIG. 8 associated with a middle of a duct of a vehicle.

In some embodiments, by positioning the dual-side heat exchangers within the middle or center of the ducts, a greater surface area is presented to oncoming airflows, thereby increasing the cooling or heat transfer capabilities of the dual-sided heat exchanger. Referring now to FIG. 10, a top schematic view illustrating airflows through the dual-side heat exchangers positioned centrally within the interior of the ducts on the sides of motor vehicle 100 from FIG. 9 is shown. In an example embodiment, an airflow pathway through first duct 400 on first side 401 of motor vehicle 100 is defined such that air flows through first inlet 424 into first duct 400 (e.g., oncoming airflow 1000), along first outer surface 812 of first dual-sided heat exchanger 800 facing towards outboard side 420 of the interior of first duct 400 (e.g., outboard side airflow 1002), along second outer surface 830 of first dual-sided heat exchanger 800 facing towards inboard side 422 of the interior of first duct 400 (e.g., inboard side airflow 1004), and exits first duct 400 through first outlet 426 (e.g., outgoing airflow 1006) located at rear end 106 of motor vehicle 100.

Similarly, an airflow pathway through second duct 402 on second side 403 of motor vehicle 100 is defined such that air flows through second inlet 434 into second duct 402 (e.g., oncoming airflow 1008), along a first outer surface of second dual-sided heat exchanger 802 facing towards outboard side 430 of the interior of second duct 402 (e.g., outboard side airflow 1012), along a second outer surface of second dual-sided heat exchanger 802 facing towards inboard side 432 of the interior of second duct 402 (e.g., inboard side airflow 1010), and exits second duct 402 through second outlet 436 (e.g., outgoing airflow 1014) located at rear end 106 of motor vehicle 100.

In this embodiment, oncoming airflows 1000, 1008 interact with the plurality of fins on both outer surfaces on the opposite sides of dual-sided heat exchangers 800, 802 to transfer heat from dual-sided heat exchangers 800, 802 (e.g., via heated coolant flowing through the plurality of heat transfer fluid passages on the middle portion of the dual-sided heat exchanger, as shown in FIG. 8) to oncoming airflows 1000, 1008. After having passed through the fins on the outer surfaces on both sides of dual-sided heat exchangers 800, 802, outgoing airflows 1006, 1014 have absorbed a portion of the heat from dual-sided heat exchangers 800, 802 such that outgoing airflows 1006, 1014 are warmer than oncoming airflows 1000, 1008.

Figure 11A:
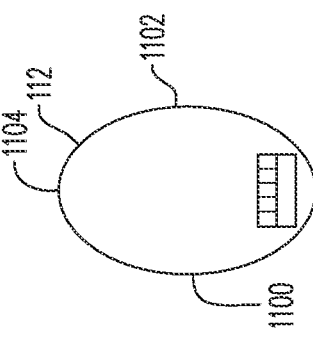
FIG. 11A is a cross-section view of the example embodiment of a heat exchanger of FIG. 4 associated with an outboard side of a duct of a vehicle.
Figure 11B:
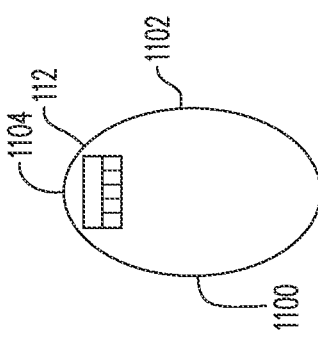
FIG. 11B is a cross-section view of the example embodiment of a heat exchanger of FIG. 7 associated with an inboard side of a duct of a vehicle.

In different embodiments, the arrangement of one or more heat exchangers within the interior of the ducts of a vehicle may vary. Referring now to FIGS. 11A through 11I, cross-section views of different example arrangements of heat exchangers positioned within the interior of a duct of vehicle 100 are shown. FIG. 11A illustrates a cross-section view of the example embodiment of heat exchanger 110 of FIG. 4 positioned on an outboard side 1100 of duct 112 such that outer surface 200 is facing towards an opposite inboard side 1102 of duct 112. FIG. 11B illustrates a cross-section view of the example embodiment of heat exchanger 110 of FIG. 7 positioned on inboard side 1102 of duct 112 such that outer surface 200 is facing towards the opposite outboard side 1100 of duct 112.

Figure 11C:
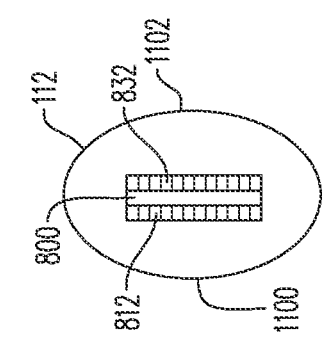
FIG. 11C is a cross-section view of the example embodiment of a heat exchanger of FIG. 8 associated with a middle of a duct of a vehicle.

FIG. 11C illustrates a cross-section view of the example embodiment of dual-sided heat exchanger 800 of FIG. 8 associated with a middle of duct 112 so that dual-sided heat exchanger 800 is approximately equidistant from outboard side 1100 and inboard side 1102. With this arrangement, first outer surface 812 of dual-sided heat exchanger 800 faces towards outboard side 1100 of duct 112 and second outer surface 832 of dual-sided heat exchanger 800 faces towards inboard side 1102 of duct 112.

Figure 11D:
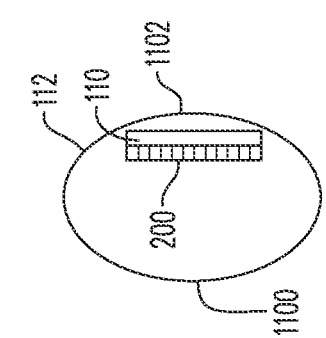
FIG. 11D is a cross-section view of another embodiment of a heat exchanger associated with a top side of a duct of a vehicle in accordance with aspects of the present disclosure.
Figure 11E:
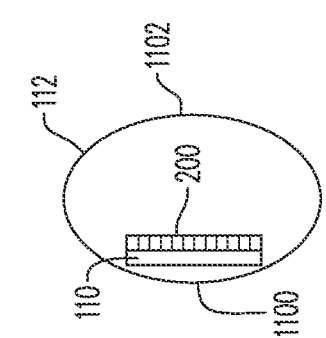
FIG. 11E is a cross-section view of another embodiment of a heat exchanger associated with a bottom side of a duct of a vehicle in accordance with aspects of the present disclosure.

In other embodiments, heat exchangers according to the example embodiments may be positioned along top and/or bottom sides of the interior of a duct of a vehicle. For example, FIG. 11D illustrates a cross-section view of another embodiment of a heat exchanger associated with a top side 1104 of duct 112 in accordance with aspects of the present disclosure. FIG. 11E illustrates a cross-section view of another embodiment of a heat exchanger associated with a bottom side 1106 of duct 112 (disposed opposite of top side 1104) in accordance with aspects of the present disclosure.

Figure 11F:
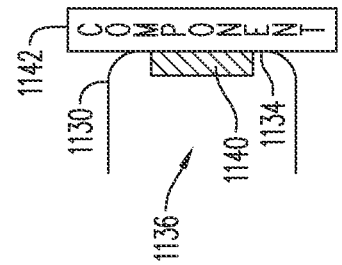
FIG. 11F is a cross-section view of another embodiment of a heat exchanger associated with a circumference of a duct of a vehicle in accordance with aspects of the present disclosure.

In some embodiments, a heat exchanger may have a similar cross-sectional shape as the duct in which it is positioned so that the heat exchanger lines or extends around an inside circumference or perimeter of the interior of the duct. For example, FIG. 11F illustrates a cross-section view of another embodiment of a heat exchanger 1112 associated with a circumference of a duct 1110 of a vehicle in accordance with aspects of the present disclosure. In this embodiment, duct 1110 has an approximately ovoid or circular cross-sectional shape and heat exchanger 1112 has a similar ovoid or circular cross-sectional shape that extends completely around the circumference of an interior 1114 of duct 1110. With this arrangement, a plurality of fins 1116 on an outer surface of heat exchanger 1112 all face inwards towards each other and interior 1114 of duct 1110. By lining or completely extending the outer surface of heat exchanger 1112 around the circumference of duct 1110 a surface area of plurality of fins 1116 of heat exchanger 1112 may be optimized or maximized within interior 1114 of duct 1110 to provide increased heat transfer capabilities.

Figure 11G:
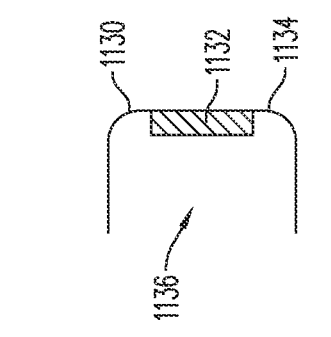
FIG. 11G is a cross-section view of another embodiment of a heat exchanger associated with a perimeter of a rectangular duct of a vehicle in accordance with aspects of the present disclosure.

In some embodiments, ducts may have other shapes. For example, FIG. 11G illustrates a cross-section view of another embodiment of a heat exchanger 1122 associated with a perimeter of a rectangular duct 1120 of a vehicle in accordance with aspects of the present disclosure. In this embodiment, duct 1120 has an approximately rectangular or square cross-sectional shape and heat exchanger 1122 has a similar rectangular or square cross-sectional shape that extends completely around the perimeter of an interior 1124 of duct 1120. With this arrangement, a plurality of fins 1126 on an outer surface of heat exchanger 1122 all face inwards towards interior 1124 of duct 1120.

Figure 11H:
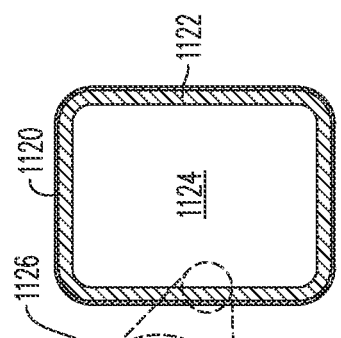
FIG. 11H is a cross-section view of another embodiment of a heat exchanger associated with an open duct of a vehicle in accordance with aspects of the present disclosure.
Figure 11I:
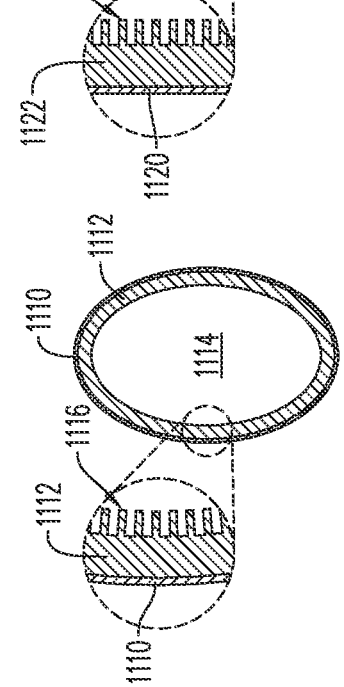
FIG. 11I is a cross-section view of another embodiment of a heat exchanger in contact with a vehicle component in an open duct of a vehicle in accordance with aspects of the present disclosure.

In some embodiments, a duct of a vehicle may not be fully enclosed along the entirety of its perimeter. For example, FIGS. 11H and 11I illustrate example embodiments of a duct for a vehicle that is open along one side of the duct so as to form an approximately C-shaped channel or passage. Referring now to FIG. 11H, in this embodiment an open duct 1130 includes a heat exchanger 1132 disposed along an interior side 1134. In this embodiment, heat exchanger 1132 is attached or disposed along interior side 1134 of open duct 1130 opposite an open side 1136. According to this embodiment, open side 1136 exposes the interior of open duct 1130 to an exterior of the vehicle. By proving open duct 1130 with open side 1136, the plurality of fins on the outer surface of heat exchanger 1130 are positioned on the exterior of the vehicle. With this arrangement, airflows traveling over the exterior of the vehicle may travel through open duct 1130 and flow along the outer surface of heat exchanger 1132.

Referring now to FIG. 11I, in this embodiment, a heat exchanger 1140 is a heat sink type heat exchanger that is in direct contact with a vehicle component 1142 through interior side 1134 of open duct 1130. Heat exchanger 1140 directly transfers heat from vehicle component 1142 to airflows traveling along the outer surface of heat exchanger 1140 without the use of a heat transfer or cooling fluid. It should be understood that other configurations and cross-sectional shapes for heat exchangers and/or ducts of a vehicle may be provided.

Figure 12:
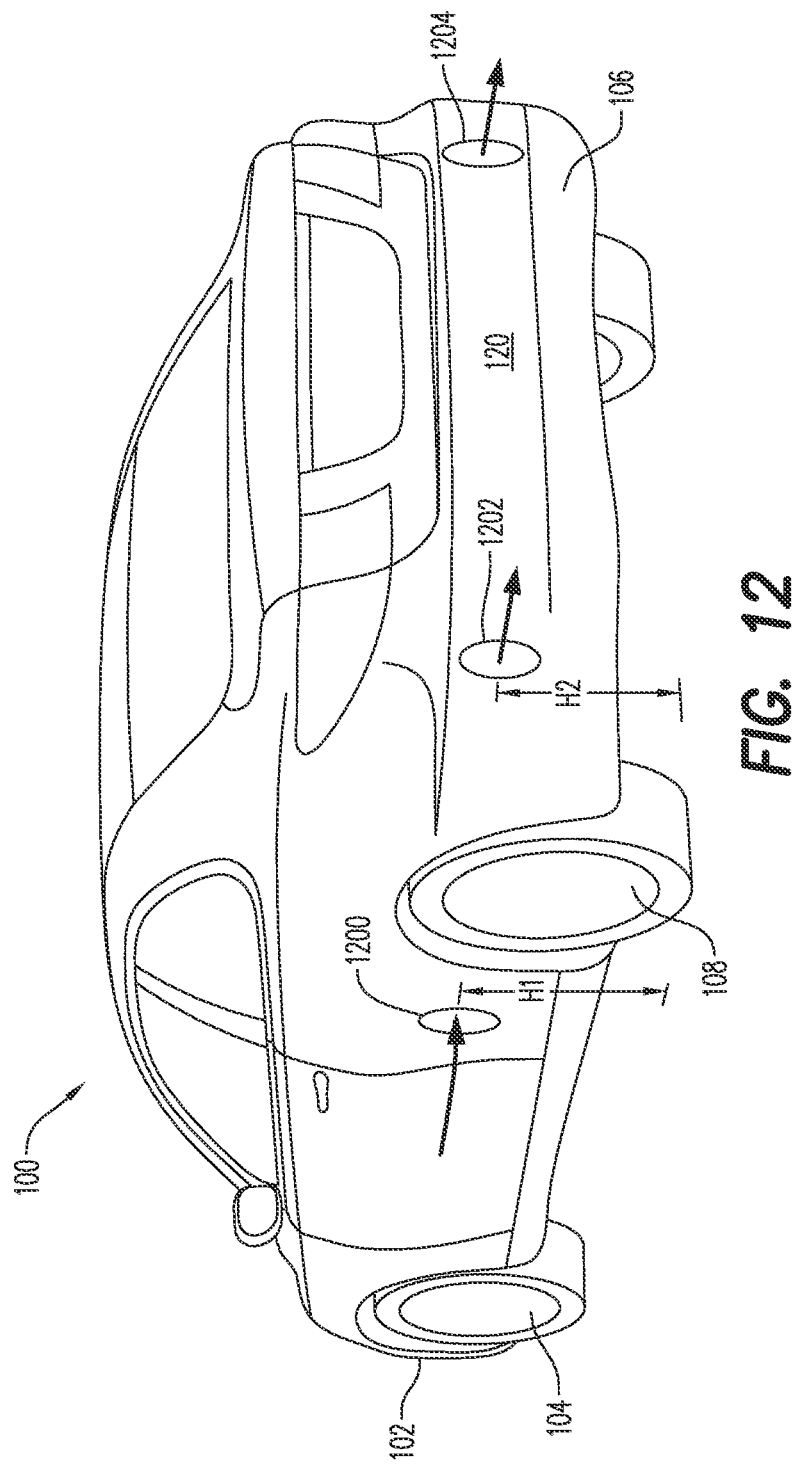
FIG. 12 is an isometric representative view of air flowing through an example embodiment of a duct of a vehicle.

In different embodiments, inlets and/or outlets of one or more ducts of a vehicle may be arranged on the vehicle body with various configurations. For example, in some embodiments, inlets of the ducts may be approximately at the same height as the outlets of the ducts. Referring now to FIG. 12, a representative view of air flowing through an example embodiment of a duct of vehicle 100 is shown. In an example embodiment, an inlet 1200 of a duct on one side vehicle 100 is disposed at a first height H1 above a ground surface (e.g., a roadway or other surface) and a first outlet 1202 is disposed at a second height H2 above the ground surface. It should be understood that another duct on the opposite side of vehicle 100 may be provided with an inlet (not shown) and a corresponding second outlet 1204. In this embodiment, inlet 1200 and first outlet 1202 are approximately at the same height above the ground surface (e.g., first height H1 is equal to second height H2).

As shown in FIG. 12, inlet 1200 is in front of second set of wheels 108 of vehicle 100 and first outlet 1202 and second outlet 1204 are behind second set of wheels 108. In one embodiment, first outlet 1202 and second outlet 1204 of the ducts on vehicle 100 are located in or on bumper 120 at rear end 106 of vehicle 100. Bumper 120 may be provided with cutouts or other provisions to accommodate first outlet 1202 and second outlet 1204 of the ducts of vehicle 100 so that air flowing through inlet 1200 and the inlet of the duct on the opposite side of vehicle 100 may exit the ducts through first outlet 1202 and second outlet 1204 in bumper 120 at rear end 106.

In some embodiments, an inlet of a duct may be located higher than an outlet of the duct. For example, referring now to FIG. 13, a representative view of air flowing through another example embodiment of a duct of vehicle 100 is shown. In this embodiment, an inlet 1300 of a duct on one side vehicle 100 is disposed at a third height H3 above a ground surface and a first outlet 1302 is disposed at a fourth height H4 above the ground surface. It should be understood that another duct on the opposite side of vehicle 100 may be provided with an inlet (not shown) and a corresponding second outlet 1304. In this embodiment, inlet 1300 and first outlet 1302 are at different heights above the ground surface, such that inlet 1300 is higher than first outlet 1302 (e.g., third height H3 is greater than fourth height H4).

Figure 13:
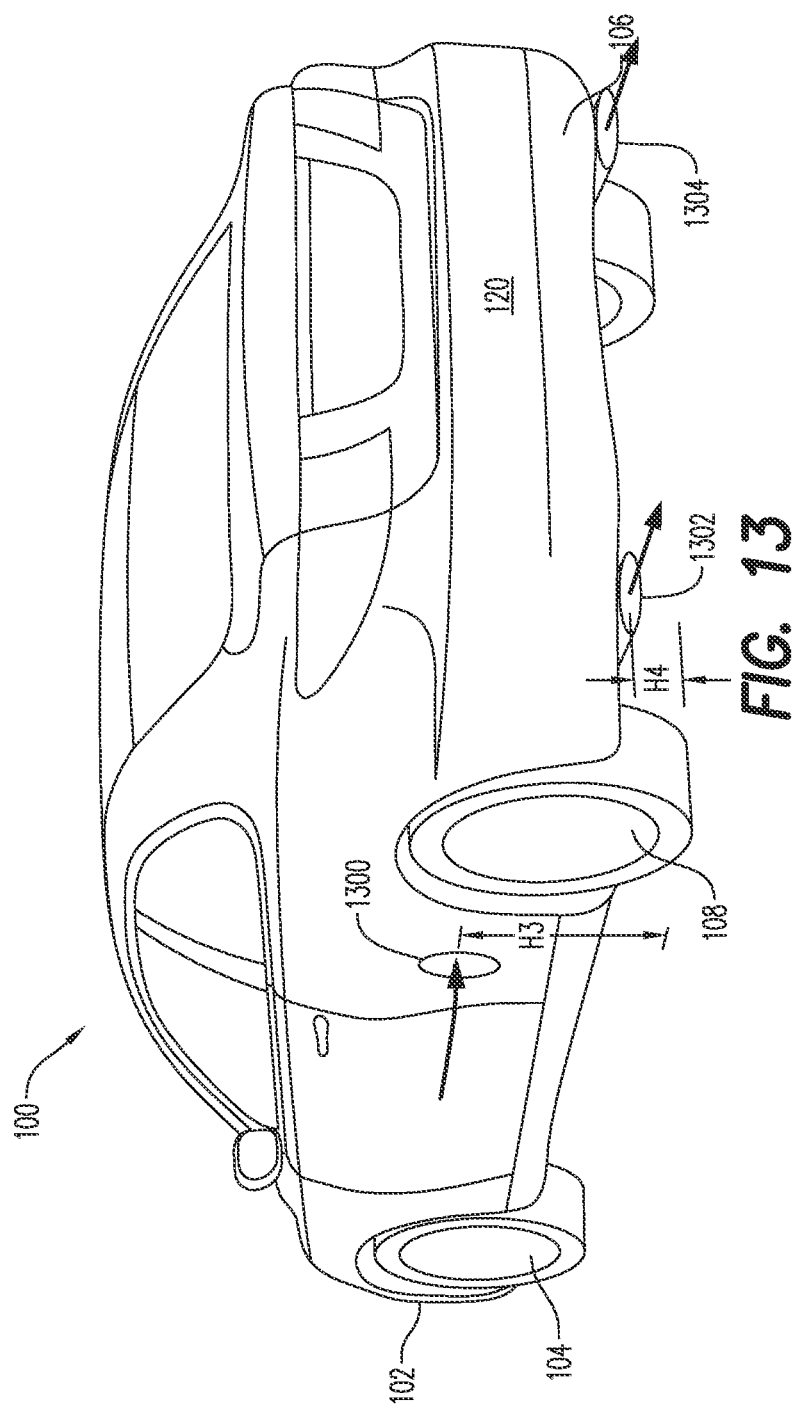
FIG. 13 is an isometric representative view of air flowing through another example embodiment of a duct of a vehicle.

As shown in FIG. 13, inlet 1300 is in front of second set of wheels 108 of vehicle 100 and first outlet 1302 and second outlet 1304 are behind second set of wheels 108. In one embodiment, first outlet 1302 and second outlet 1304 of the ducts on vehicle 100 are located below or beneath bumper 120 at rear end 106 of vehicle 100. Air flowing through inlet 1300 and the inlet of the duct on the opposite side of vehicle 100 may exit the ducts through first outlet 1302 and second outlet 1304 from below or beneath bumper 120 at rear end 106 of vehicle 100.

In some embodiments, an inlet of a duct may be located lower than an outlet of the duct. For example, referring now to FIG. 14, a representative view of air flowing through another example embodiment of a duct of vehicle 100 is shown. In this embodiment, an inlet 1400 of a duct on one side vehicle 100 is disposed at a fifth height H5 above a ground surface and a first outlet 1402 is disposed at a sixth height H6 above the ground surface. It should be understood that another duct on the opposite side of vehicle 100 may be provided with an inlet (not shown) and a corresponding second outlet 1404. In this embodiment, inlet 1400 and first outlet 1402 are at different heights above the ground surface, such that inlet 1400 is lower than first outlet 1402 (e.g., fifth height H5 is less than sixth height H6).

Figure 14:
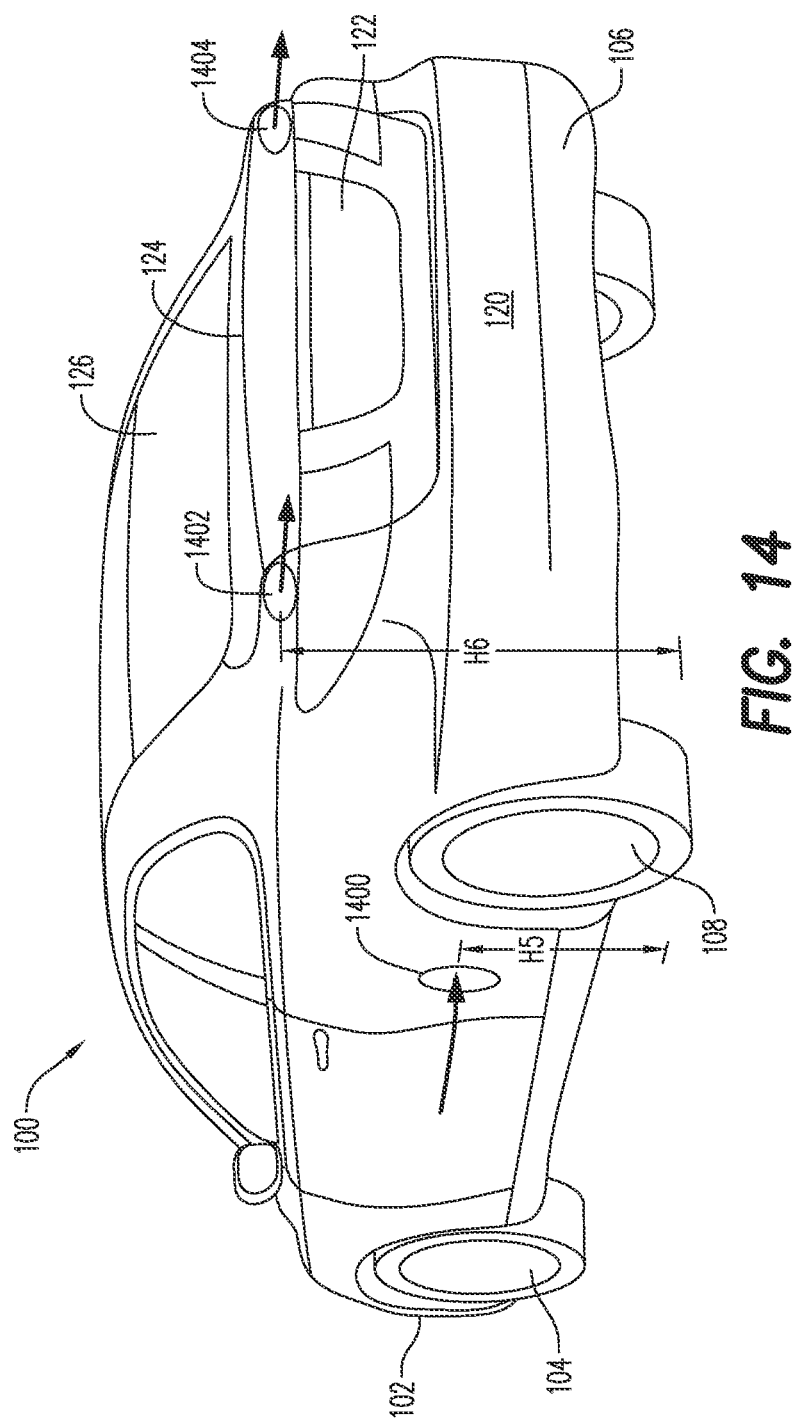
FIG. 14 is an isometric representative view of air flowing through another example embodiment of a duct of a vehicle.

As shown in FIG. 14, inlet 1400 is in front of second set of wheels 108 of vehicle 100 and first outlet 1402 and second outlet 1404 are behind second set of wheels 108. In one embodiment, first outlet 1402 and second outlet 1404 of the ducts on vehicle 100 are located on portions of vehicle 100 above bumper 120 at rear end 106 of vehicle 100. For example, as shown in FIG. 14, first outlet 1402 and second outlet 1404 are provided on a decklid 124 of vehicle 100 behind a rear windshield 126. In other embodiments, first outlet 1402 and second outlet 1404 may be located at other portions of vehicle 100 above bumper 120, such as on either side of a trunk 122 of vehicle 100. In these embodiments, air flowing through inlet 1400 and the inlet of the duct on the opposite side of vehicle 100 may exit the ducts through first outlet 1402 and second outlet 1404 from above bumper 120 at rear end 106 of vehicle 100.

In still other embodiments, an outlet of a duct may be located along the sides of the vehicle, behind or rearward of the inlet. For example, in some embodiments, an outlet of a duct may be located in a rear fender of the vehicle. In other embodiments, the outlet may be located in front of or forward of a rear axle of the vehicle. In addition, in some embodiments, the duct may pass or extend through one or more portions of the vehicle, such as a quarter panel or door of the vehicle.

With reference to FIGS. 15A and 15B, configurations for the plurality of fins on the surface of a heat exchanger are illustrated. More particularly, FIG. 15A discloses plurality of fins 310 on outer surface 200 of heat exchanger 110 defining straight, continuous members that are generally parallel to one another and have a predetermined spacing therebetween defining channels 312, described above. In addition, each fin of plurality of fins 310 may include front or leading edge 314 with an angled configuration to guide the air flow along outer surface 200 of heat exchanger 110 in a smooth manner (i.e., so as to not disrupt the airflow) and to further reduce drag through the ducts.

In an alternative configuration shown in FIG. 15B, another example embodiment of a heat exchanger 1500 having an outer surface 1502 with a plurality of fins 1510 is shown. In this embodiment, plurality of fins 1510 are defined by curved continuous members that are generally parallel to one another and have a predetermined spacing 1512 therebetween. In contrast to the generally straight configuration of fins 310 shown in FIG. 15A, plurality of fins 1510 shown in FIG. 15B have a wavy configuration extending along outer surface 1502 of heat exchanger 1500 in a serpentine or undulating manner (e.g., a series of alternating curves).

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A heat transfer system for a vehicle, the system comprising:
   a first duct on one side of the vehicle providing a passageway for air flowing through the first duct when the vehicle is moving, the first duct having an inlet located forward of a rear axle of the vehicle and an outlet located rearward of the rear axle;
   a first surface heat exchanger positioned within an interior of the first duct;
   a flow-through radiator located at a front of the vehicle and spaced apart from the first surface heat exchanger;
   at least one vehicle component, wherein the at least one vehicle component includes an engine or motor in fluid communication with the flow-through radiator;
   a heat transfer fluid reservoir in fluid communication with both the first surface heat exchanger and the flow-through radiator, wherein the heat transfer fluid reservoir stores fluid moving through the first surface heat exchanger, the at least one vehicle component, and the flow-through radiator;
   a pump;
   the first surface heat exchanger forming a heat transfer fluid flow circuit with the at least one vehicle component, the flow-through radiator, the heat transfer fluid reservoir, and the pump such that the fluid in the heat transfer fluid reservoir circulates through each of the first surface heat exchanger, the flow-through radiator, and the at least one vehicle component;
   wherein the first surface heat exchanger forms an air flow pathway defined so that air flows through the inlet into the first duct, along an outer surface of the first surface heat exchanger within the interior of the first duct, and exits the first duct through the outlet.

2. The heat transfer system according to claim 1, wherein the inlet is positioned at a same height above a ground surface as the outlet.

3. The heat transfer system according to claim 1, wherein the inlet is positioned at a height above a ground surface that is higher than a height of the outlet.

4. The heat transfer system according to claim 1, wherein the inlet is positioned at a height above a ground surface that is lower than a height of the outlet.

5. The heat transfer system according to claim 1, wherein the outlet is positioned in a bumper of the vehicle.

6. The heat transfer system according to claim 1, wherein the outlet is positioned above or below a bumper of the vehicle.

7. The heat transfer system according to claim 1, further comprising:
   a second duct on an opposite side of the vehicle from the first duct providing a passageway for air flowing through the second duct when the vehicle is moving, the second duct having an inlet located forward of the rear axle of the vehicle and an outlet located rearward of the rear axle;
   a second surface heat exchanger positioned within an interior of the second duct;
   the second surface heat exchanger forming part of the heat transfer fluid flow circuit with the first surface heat exchanger, the at least one vehicle component, the heat transfer fluid reservoir, and the pump; and
   wherein the second surface heat exchanger forms an air flow pathway defined so that air flows through the inlet into the second duct, along an outer surface of the second surface heat exchanger within the interior of the second duct, and exits the second duct through the outlet.

8. The heat transfer system according to claim 1, wherein the plurality of fins of the first surface heat exchanger extend completely around a perimeter of the interior of the first duct.

9. The heat transfer system according to claim 1, wherein the first duct has an approximately ovoid or circular cross-sectional shape.

10. The heat transfer system according to claim 1, wherein the first duct has an approximately rectangular or square cross-sectional shape.

11. A vehicle heat transfer system, comprising:
    a duct having an inlet located forward of a rear axle of a vehicle and an outlet located rearward of the rear axle, the duct providing a passageway for air flowing through the duct when the vehicle is moving;
    a surface heat exchanger comprising an outer surface having a plurality of fins, wherein the outer surface including the plurality of fins is exposed to the air flowing through the duct;
    a flow-through radiator located at a front of the vehicle and spaced apart from the surface heat exchanger;
    a vehicle component in fluid communication with the flow-through radiator;
    a heat transfer fluid reservoir in fluid communication with both the surface heat exchanger and the flow-through radiator, wherein the heat transfer fluid reservoir stores fluid moving through the surface heat exchanger, the vehicle component, and the flow-through radiator;
    a pump that circulates the fluid from the heat transfer fluid reservoir through each of the surface heat exchanger, the flow-through radiator, and the vehicle component;
    wherein an air flow pathway through the duct is defined so that air flows through the inlet into the duct, along the plurality of fins on the outer surface of the surface heat exchanger, and exits the duct through the outlet.

12. The vehicle heat transfer system according to claim 11, wherein the duct includes an open end along one side of the duct; and
    wherein the plurality of fins on the outer surface of the surface heat exchanger are positioned on an interior side of the duct.

13. The vehicle heat transfer system according to claim 11, wherein the plurality of fins are aligned approximately parallel to the air flow pathway of the air flowing through the duct.

14. The vehicle heat transfer system according to claim 11, wherein the surface heat exchanger is directly attached to a vehicle component through an interior side of the duct.

* * * * *